United States Patent
De Lega et al.

(10) Patent No.: US 7,636,168 B2
(45) Date of Patent: Dec. 22, 2009

(54) INTERFEROMETRY METHOD AND SYSTEM INCLUDING SPECTRAL DECOMPOSITION

(75) Inventors: Xavier Colonna De Lega, Middletown, CT (US); Peter De Groot, Middletown, CT (US)

(73) Assignee: Zygo Corporation, Middlefield, CT (US)

(*) Notice: Subject to any disclaimer, the term of this patent is extended or adjusted under 35 U.S.C. 154(b) by 250 days.

(21) Appl. No.: 11/546,119

(22) Filed: Oct. 11, 2006

(65) Prior Publication Data
US 2007/0086013 A1    Apr. 19, 2007

Related U.S. Application Data

(60) Provisional application No. 60/726,005, filed on Oct. 11, 2005.

(51) Int. Cl.
*G01B 11/02* (2006.01)
(52) U.S. Cl. ............................................. 356/512
(58) Field of Classification Search ............. 356/456, 356/511, 512, 489, 479, 451, 496
See application file for complete search history.

(56) References Cited

U.S. PATENT DOCUMENTS

| | | | |
|---|---|---|---|
| 2,612,074 A | 9/1952 | Mirau | |
| 4,188,122 A | 2/1980 | Massie et al. | |
| 4,199,219 A | 4/1980 | Suzki et al. | |
| 4,340,306 A | 7/1982 | Balasubramanian | |
| 4,355,903 A | 10/1982 | Sandercock | |
| 4,523,846 A | 6/1985 | Breckinridge et al. | |
| 4,576,479 A | 3/1986 | Downs | |
| 4,583,858 A | 4/1986 | Lebling et al. | |
| 4,618,262 A | 10/1986 | Maydan et al. | |
| 4,639,139 A | 1/1987 | Wyant et al. | |
| 4,660,980 A * | 4/1987 | Takabayashi et al. | 356/504 |
| 4,710,642 A | 12/1987 | McNeil | |
| 4,806,018 A | 2/1989 | Falk | |

(Continued)

FOREIGN PATENT DOCUMENTS

DE    4108944    9/1992

(Continued)

OTHER PUBLICATIONS

Sellar and Rafert, "Effects fo aberrations on spatially modulated Fourier transform spectrometers," Sep. 1994, Optical Engineering, vol. 33, No. 9, pp. 3087-3092.*

(Continued)

*Primary Examiner*—Gregory J Toatley, Jr.
*Assistant Examiner*—Scott M Richey
(74) *Attorney, Agent, or Firm*—Fish & Richardson P.C.

(57) ABSTRACT

In general, in one aspect, the disclosure features a method that includes directing measurement light to reflect from a measurement surface and combining the reflected measurement light with reference light, where the measurement light and reference light are derived from a common source, and there is a non-zero optical path length difference between the measurement light and reference light that is greater than a coherence length of the measurement light. The method further includes spectrally dispersing the combined light onto a multi-element detector to detect a spatially-varying intensity pattern, determining spatial information about the measurement surface based on the spatially-varying intensity pattern, and outputting the spatial information.

58 Claims, 8 Drawing Sheets

U.S. PATENT DOCUMENTS

| | | | |
|---|---|---|---|
| 4,818,110 A | 4/1989 | Davidson | |
| 4,869,593 A | 9/1989 | Biegen | |
| 4,923,301 A | 5/1990 | White | |
| 4,948,253 A | 8/1990 | Biegen | |
| 4,964,726 A | 10/1990 | Kleinknecht et al. | |
| 4,999,014 A | 3/1991 | Gold et al. | |
| 5,042,949 A | 8/1991 | Greenberg et al. | |
| 5,042,951 A | 8/1991 | Gold et al. | |
| 5,073,018 A | 12/1991 | Kino et al. | |
| 5,112,129 A | 5/1992 | Davidson et al. | |
| 5,129,724 A | 7/1992 | Brophy et al. | |
| 5,133,601 A | 7/1992 | Cohen et al. | |
| 5,135,307 A | 8/1992 | De Groot et al. | |
| 5,153,669 A * | 10/1992 | DeGroot | 356/489 |
| 5,164,790 A | 11/1992 | McNeil et al. | |
| 5,166,751 A | 11/1992 | Massig | |
| 5,173,746 A | 12/1992 | Brophy | |
| 5,194,918 A | 3/1993 | Kino et al. | |
| 5,241,369 A | 8/1993 | McNeil et al. | |
| 5,301,010 A | 4/1994 | Jones et al. | |
| 5,355,221 A | 10/1994 | Cohen et al. | |
| 5,384,717 A | 1/1995 | Ebenstein | |
| 5,386,119 A | 1/1995 | Ledger | |
| 5,390,023 A | 2/1995 | Biegen | |
| 5,398,113 A | 3/1995 | de Groot | |
| 5,402,234 A | 3/1995 | Deck | |
| 5,459,564 A | 10/1995 | Chivers | |
| 5,471,303 A | 11/1995 | Ai et al. | |
| 5,481,811 A | 1/1996 | Smith | |
| 5,483,064 A | 1/1996 | Frey et al. | |
| 5,491,524 A * | 2/1996 | Hellmuth et al. | 351/212 |
| 5,539,517 A | 7/1996 | Cabib et al. | |
| 5,543,841 A | 8/1996 | Kanamori | |
| 5,555,471 A | 9/1996 | Xu et al. | |
| 5,587,792 A | 12/1996 | Nishizawa et al. | |
| 5,589,938 A | 12/1996 | Deck | |
| 5,602,643 A | 2/1997 | Barrett | |
| 5,633,714 A | 5/1997 | Nyyssonen | |
| 5,640,270 A | 6/1997 | Aziz et al. | |
| 5,703,692 A | 12/1997 | McNeil et al. | |
| 5,729,343 A * | 3/1998 | Aiyer | 356/504 |
| 5,757,502 A | 5/1998 | Weling | |
| 5,774,224 A | 6/1998 | Kerstens | |
| 5,777,740 A | 7/1998 | Lacey et al. | |
| 5,777,742 A * | 7/1998 | Marron | 356/458 |
| 5,784,164 A | 7/1998 | Deck et al. | |
| 5,856,871 A | 1/1999 | Cabib et al. | |
| 5,867,276 A | 2/1999 | McNeil et al. | |
| 5,880,838 A | 3/1999 | Marx et al. | |
| 5,900,633 A | 5/1999 | Solomon et al. | |
| 5,909,282 A * | 6/1999 | Kulawiec | 356/504 |
| 5,912,741 A | 6/1999 | Carter et al. | |
| 5,923,423 A | 7/1999 | Sawarti et al. | |
| 5,953,124 A | 9/1999 | Deck | |
| 5,956,141 A | 9/1999 | Hayashi | |
| 5,963,329 A | 10/1999 | Conrad et al. | |
| 6,028,670 A | 2/2000 | Deck | |
| 6,160,621 A | 12/2000 | Perry et al. | |
| 6,242,739 B1 | 6/2001 | Cherkassky | |
| 6,249,351 B1 | 6/2001 | De Groot | |
| 6,259,521 B1 | 7/2001 | Miller et al. | |
| 6,275,297 B1 | 8/2001 | Zalicki | |
| 6,377,349 B1 * | 4/2002 | Fercher | 356/497 |
| 6,381,009 B1 | 4/2002 | McGahan | |
| 6,392,749 B1 | 5/2002 | Meeks et al. | |
| 6,417,109 B1 | 7/2002 | Jordan et al. | |
| 6,429,943 B1 | 8/2002 | Opsal et al. | |
| 6,449,066 B1 | 9/2002 | Arns et al. | |
| 6,483,580 B1 | 11/2002 | Xu et al. | |
| 6,500,591 B1 | 12/2002 | Adams | |
| 6,507,405 B1 | 1/2003 | Grek et al. | |
| 6,525,825 B2 * | 2/2003 | de Groot et al. | 356/517 |
| 6,545,761 B1 | 4/2003 | Aziz et al. | |
| 6,545,763 B1 | 4/2003 | Kim et al. | |
| 6,590,656 B2 | 7/2003 | Xu et al. | |
| 6,597,460 B2 | 7/2003 | Groot et al. | |
| 6,611,330 B2 | 8/2003 | Lee et al. | |
| 6,624,894 B2 | 9/2003 | Olszak et al. | |
| 6,633,389 B1 | 10/2003 | Poris et al. | |
| 6,633,831 B2 | 10/2003 | Nikoonahad et al. | |
| 6,636,322 B1 | 10/2003 | Terashita | |
| 6,694,284 B1 | 2/2004 | Nikoonahad et al. | |
| 6,714,307 B2 | 3/2004 | De Groot et al. | |
| 6,721,094 B1 | 4/2004 | Sinclair et al. | |
| 6,741,357 B2 | 5/2004 | Wang et al. | |
| 6,741,360 B2 | 5/2004 | D'Agraives et al. | |
| 6,775,006 B2 | 8/2004 | De Groot et al. | |
| 6,775,009 B2 | 8/2004 | Hill | |
| 6,798,511 B1 | 9/2004 | Zhan et al. | |
| 6,822,745 B2 | 11/2004 | De Groot et al. | |
| 6,856,384 B1 | 2/2005 | Rovira | |
| 6,882,433 B2 * | 4/2005 | Marron et al. | 356/512 |
| 6,888,638 B1 | 5/2005 | Hill | |
| 6,891,627 B1 | 5/2005 | Levy et al. | |
| 6,909,509 B2 | 6/2005 | DeGroot | |
| 6,925,860 B1 | 8/2005 | Poris et al. | |
| 6,940,604 B2 | 9/2005 | Jung et al. | |
| 6,956,658 B2 | 10/2005 | Meeks et al. | |
| 6,956,660 B2 | 10/2005 | Meeks et al. | |
| 6,985,232 B2 | 1/2006 | Sezginer | |
| 6,989,905 B2 | 1/2006 | De Groot | |
| 6,999,180 B1 | 2/2006 | Janik et al. | |
| 7,012,700 B2 * | 3/2006 | De Groot et al. | 356/512 |
| 7,018,271 B2 | 3/2006 | Wiswesser et al. | |
| 7,030,995 B2 * | 4/2006 | De Groot et al. | 356/512 |
| 7,046,371 B2 | 5/2006 | De Lega et al. | |
| 7,061,623 B2 * | 6/2006 | Davidson | 356/497 |
| 7,068,376 B2 | 6/2006 | De Groot | |
| 7,088,451 B2 | 8/2006 | Sezginer | |
| 7,102,761 B2 | 9/2006 | De Lega et al. | |
| 7,106,454 B2 | 9/2006 | De Groot et al. | |
| 7,119,909 B2 | 10/2006 | Unruh et al. | |
| 7,139,081 B2 | 11/2006 | De Groot | |
| 7,139,083 B2 | 11/2006 | Fielden et al. | |
| 7,142,311 B2 * | 11/2006 | De Lega | 356/497 |
| 7,177,030 B2 | 2/2007 | Leizerson | |
| 7,239,398 B2 | 7/2007 | De Groot et al. | |
| 7,271,918 B2 | 9/2007 | De Groot et al. | |
| 7,283,248 B2 | 10/2007 | Hill | |
| 7,289,225 B2 | 10/2007 | De Groot | |
| 7,298,494 B2 | 11/2007 | De Groot | |
| 7,304,747 B2 | 12/2007 | De Lega | |
| 7,315,382 B2 | 1/2008 | De Groot | |
| 7,324,210 B2 | 1/2008 | De Groot et al. | |
| 7,324,214 B2 | 1/2008 | De Groot et al. | |
| 7,433,046 B2 * | 10/2008 | Everett et al. | 356/479 |
| 7,446,882 B2 * | 11/2008 | De Lega et al. | 356/512 |
| 2002/0015146 A1 | 2/2002 | Meeks et al. | |
| 2002/0135775 A1 | 9/2002 | De Groot et al. | |
| 2002/0196450 A1 | 12/2002 | Olszak et al. | |
| 2003/0011784 A1 | 1/2003 | de Groot et al. | |
| 2003/0048458 A1 | 3/2003 | Mieher et al. | |
| 2003/0075721 A1 | 4/2003 | Li | |
| 2003/0112444 A1 | 6/2003 | Yang et al. | |
| 2003/0137671 A1 | 7/2003 | De Groot et al. | |
| 2003/0197871 A1 | 10/2003 | Groot | |
| 2004/0027576 A1 | 2/2004 | De Groot et al. | |
| 2004/0075843 A1 | 4/2004 | Marron et al. | |
| 2004/0085544 A1 | 5/2004 | De Groot | |
| 2004/0185582 A1 | 9/2004 | Kueny | |
| 2004/0189999 A1 * | 9/2004 | De Groot et al. | 356/497 |
| 2004/0233442 A1 | 11/2004 | Mieher et al. | |
| 2004/0233444 A1 | 11/2004 | Mieher et al. | |
| 2004/0239938 A1 * | 12/2004 | Izatt | 356/450 |

| | | |
|---|---|---|
| 2004/0246493 A1 | 12/2004 | Kim et al. |
| 2005/0057757 A1 | 3/2005 | Colonna De Lega et al. |
| 2005/0068540 A1 | 3/2005 | De Groot et al. |
| 2005/0073692 A1 | 4/2005 | De Groot |
| 2005/0078318 A1 | 4/2005 | De Groot |
| 2005/0078319 A1 | 4/2005 | De Groot |
| 2005/0088663 A1 | 4/2005 | De Groot et al. |
| 2005/0146727 A1 | 7/2005 | Hill |
| 2005/0179911 A1 | 8/2005 | Boomgarden et al. |
| 2005/0225769 A1 | 10/2005 | Bankhead et al. |
| 2005/0237534 A1 | 10/2005 | Deck |
| 2005/0237537 A1 | 10/2005 | Leizerson et al. |
| 2006/0012582 A1 | 1/2006 | De Lega |
| 2006/0119841 A1 | 6/2006 | Saunders et al. |
| 2006/0158657 A1 | 7/2006 | De Lega et al. |
| 2006/0158658 A1 | 7/2006 | Colonna de Lega et al. |
| 2006/0158659 A1 | 7/2006 | Colonna de Lega et al. |
| 2006/0187465 A1 | 8/2006 | Groot |
| 2006/0262321 A1 | 11/2006 | De Groot |
| 2007/0008551 A1 | 1/2007 | Tang |
| 2007/0046953 A1 | 3/2007 | de Groot et al. |
| 2007/0081167 A1 | 4/2007 | De Groot |
| 2007/0086013 A1 | 4/2007 | De Lega et al. |
| 2007/0091317 A1 | 4/2007 | Freischlad et al. |
| 2007/0091318 A1 | 4/2007 | Freischlad et al. |
| 2007/0097380 A1 | 5/2007 | De Groot et al. |
| 2007/0127036 A1 | 6/2007 | Liao et al. |
| 2007/0139656 A1 | 6/2007 | Wan |
| 2007/0247637 A1 | 10/2007 | De Groot |
| 2008/0018901 A1 | 1/2008 | de Groot |
| 2008/0088849 A1 | 4/2008 | de Lega et al. |

FOREIGN PATENT DOCUMENTS

| | | |
|---|---|---|
| DE | 4309056 | 9/1994 |
| EP | 0 397 388 | 11/1990 |
| EP | 0 549 166 | 6/1993 |
| EP | 0 617 255 | 9/1994 |
| EP | 0 929 094 | 7/1999 |
| GB | 2385417 | 8/2003 |
| JP | 8327327 | 12/1996 |
| JP | 2000121317 | 4/2000 |
| KR | 20000061037 | 10/2000 |
| WO | WO 93/24805 | 12/1993 |
| WO | WO 95/09343 | 4/1995 |
| WO | WO 97/44633 | 11/1997 |
| WO | WO 02/082008 | 10/2002 |
| WO | WO03/036229 A1 | 5/2003 |
| WO | WO 03/062802 | 7/2003 |
| WO | WO 2004/023071 | 3/2004 |
| WO | WO2005/029192 A2 | 3/2005 |

OTHER PUBLICATIONS

7151607, Dec. 2008, De Goot et al., (withdrawn).
Abdulhalim, "Spectroscopic interference microscopy technique for measurement of layer parameters", Meas. Sci. Technol., vol. 12, pp. 1996-2001 (2001).
Akcay et al., "Spectral shaping to improve the point spread function in optical coherence tomography", Optics Letters, vol. 28, No. 20, pp. 1921-1923 (Oct. 15, 2003).
Azzam et al, "Ellipsometric function of a film-substrate system: Applications to the design of reflection-type optical devices and to ellipsometry", Journal of the Optical Society of America, vol. 5, No. 3, pp. 252-260 (1975).
Azzam et al., "Reflection and Transmission of Polarized Light by Stratified Planar Structures", Ellipsometry and Polarized Light, Elsevier Science B.V. ISBN 0 444 87016 4 (Paperback) pp. 267-363 (1987).
Bashkansky et al., "Signal Processing for Improving Field Cross-correlation Function in Optical Coherence Tomography", Supplement to Optics & Photonics News, 9(5) (May 1998).
Berman et al., "Review of In Situ & In-line Detection for CMP Applications", Semiconductor Fabtech—8.sup.th Edition, pp. 267-274.
Biegen, "Determination of the Phase Change on Reflection from Two-beam Interference," Optics Letters, 19:21:1690-1692, Nov. 1, 1994.
Bishop, et al., "Grating line shape characterization using scatterometry," SPIE 1545, 64-73 (1991).
Bosseboeuf et al., Application of microscopic interferometry techniques in the MEMS field, Proc. SPIE, 5145, pp. 1-16 (2003). cited by other.
Chim, S. S. C. And Kino, G. S., "Three-Dimensional Image Realization in Interference Microscopy", Applied Optics, May 10, 1992, vol. 31, No. 14..
Creath, "Step height measurement using two-wavelength phase-shifting interferometry", Applied Optics, vol. 26, No. 14, pp. 2810-2816 (Jul. 15, 1987).
Danielson et al., "Absolute Optical Ranging Using Low Coherence Interferometry," Applied Optics, 30:21:2975-2979, Jul. 20, 1991.
Davidson et al., "An Application of Interference Microscopy to Integrated Circuit Inspection and Metrology", Proceedings of SPIE, vol. 775, pp. 233-247 (1987).
de Groot et al., "Angle-resolved three-dimensional analysis of surface films by coherence scanning interferometry", Optics Letters, vol. 32, No. 12, pp. 1638-1640 (Jun. 15, 2007).
de Groot et al., "Determination of fringe order in white-light interference microscopy", Appl. Opt., 41(22) pp. 4571-4578 (2002).
de Groot et al., "Signal modeling for low coherence height-scanning interference microscopy", Applied Optics, vol. 43 No. 25, pp. 4821-4830 (Sep. 1, 2004).
de Groot et al., "Signal modeling for modern interference microscopes", SPIE Proceedings vol. 5457, pp. 26-34 (2004).
de Groot et al.; "Three-dimensional imaging by sub-Nyquist sampling of white-light interfergrams"; Optics Letters vol. 18, No. 17; pp. 1462-1464, Sep. 1, 1993.
de Groot, "Extending the unambiguous range of two-color interferometers", Applied Optics, vol. 33, No. 25, pp. 5948-5953 (Sep. 1, 1994).
de Groot, "Derivation of algorithms for phase-shifting interferometry using the concept of a data-sampling window", Appl. Opt., 34(22), p. 4723-4730 (1995).
de Groot, "Three-color laser-diode interferometer", Applied Optics, vol. 30, No. 25, pp. 3612-3616 (Sep. 1, 1991).
de Groot, P., "Phase-shift calibration errors in interometers with spherical Fizeua cavities," Applied Optics, vol. 34:16, pp. 2856-2863 (Jun. 1, 1995).
de Lega, X., et al., "Optical topography measurement of patterned wafers," American Institute of Physics Conference Proceedings, vol. 788, pp. 432-436 (2005).
Debnath, S.K., et al., "Spectrally resolved phase-shifting interferometry of transparent thin films: sensitivity of thickness measurements," Appl. Opt. 45, 34 8636-8640 (2006).
Deck et al., "Two-color light-emitting-diode source for high-precision phase-shifting interferometry", Optics Letters, vol. 18, No. 22, pp. 1899-1901 (Nov. 15, 1993).
Dresel et al., "Three Dimensional Sensing of Rough Surfaces by Coherence Radar, " Applied Optics, 31:7:919-925, Mar. 1, 1992.
Encyclopedia of Laser Physics and Technology, http:\\www.rp-photonics.com\coherence.html.
Encyclopedia of Laser Physics and Technology, http:\\www.rp-photonics.com\single mode fibers.html.
Encyclopedia of Laser Physics and Technology, http:\\www.rp-photonics.com\photonic crystal fibers.html.
Encyclopedia of Laser Physics and Technology, http:\\www.rp-photonics.com\supercontinuum generation.html.
Feke, Gilbert D. et al., "Interferometric back focal plane microellipsometry", Applied Optics, vol. 37, No. 10, pp. 1796-1802 (Apr. 1, 1998).
Flournoy et al., "White-light interferometric thickness gauge", Appl. Opt., 11(9), pp. 1907-1915 (1972).
Gale et al., "Linnik microscope imaging of integrated circuit structures", Applied Optics vol. 35, No. 1, pp. 131-148 (Jan. 1, 1996).

Ghiglia et al., "Quality-Guided Path Following", Two-Dimensional Phase Unwrapping—Theory, Algorithms and Software, John Wiley & Sons publishers, ISBN 0-471-24935-1, pp. 122-136 (1998).

Greivenkamp, "Generalized data reduction for heterodyne interferometry", Opt. Eng., vol. 23 No. 4, pp. 350-352 (Jul./Aug. 1984).

Hausler et al., "Coherence Radar and Spectral Radar—New Tools for Dermatological Diagnosis", Journal of Biomedical Optics, vol. 3, No. 1, pp. 21-31 (Jan. 1998).

Hecht, "Basics of Coherence Theory," Optics, 2nd Ed., Addison Wesley, pp. 516-517 (1987).

Holmes et al., "Scanning microellipsometry for extraction of true topography", Electronics Letters, vol. 31, No. 5, pp. 358-359 (Mar. 2, 1995).

Kim, Seung-Woo et al., "Thickness-profile measurement of transparent thin-film layers by white-light scanning interferometry", Applied Optics, vol. 38, No. 28, pp. 5968-5973 (Oct. 1, 1999).

Kino et al., "Mirau Correlation Microscope," Applied Optics, 29:26:3775-3783, Sep. 10, 1990.

Kleinknecht, et al., "Linewidth measurement on IC masks and wafers by grating test patterns," Appl. Opt. 19(4), 523-533 (1980).

Kohlhaas, A. Fromchen, C. and Brinkmeyer, E., "High-Resolution OCDR for Testing Integrated-Optical Waveguides: Dispersion-Corrupted Experimental Data Corrected by a Numerical Algorithm", Journal of Lightwave Technology, Nov. 1991, vol. 9, No. 11.

Kujawinska, Malgorzata, "Spatial Phase Measurement Methods", Interferogram Analysis: Digital Fringe Pattern Measurement Techniques, IOP Publishing Ltd. 1993, pp. 141-193.

Larkin, "Efficient nonlinear algorithm for envelope detection in white light interferometry", J. Opt. Soc. Am A4, pp. 832-843 (1996).

Lee et al., "Profilometry with a coherence scanning microscope", Appl. Opt., 29(26), pp. 3784-3788 (1990).

Lee-Bennett, "Advances in non-contacting surface metrology", OF&T Workshop, paper OTuC1 (2004).

Leonhardt et al., "Micro-Ellipso-Height-Profilometry", Optics Communications, vol. 80, No. 3, 4, pp. 205-209 (Jan. 1, 1991).

Liu et al., "Common path interferometric microellipsometry", SPIE, vol. 2782, pp. 635-645 (1996).

Lyakin et al., "The interferometric system with resolution better than coherence length for determination of geometrical thickness and refractive index of a layer object", Proceedings of the SPIE—The International Society for Optical Engineering SPIE-IN.

Morgan, "Least-Squares estimation in phase-measurement interferometry", Apt. Let., 7(8), pp. 368-370 (1982).

Naqvi, et al., "Linewidth measurement of gratings on photomasks: a simple technique," Appl. Opt., 31(10), 1377-1384 (1992).

Ngoi et al., "Phase-shifting interferometry immune to vibration", Applied Optics, vol. 40, No. 19, pp. 3211-3214 (2001).

Novak et al., "Template-based software for accurate MEMS characterization", Proceedings of SPIE, Fol. 4980, pp. 75-80 (2003).

Onodera et al., "Two-wavelength interferometry that uses a Fourier-transform method", Applied Optics, vol. 37, No. 34, pp. 7988-7994 (Dec. 1, 1998).

Oppenheim et al., "10.3: The time-dependent Fourier Transform", Discrete-Time Signal Processing, 2.sup.nd Edition, pp. 714-722 (Prentice Hall, New Jersey, 1999). cited by other.

Park et al., "Direct quadratic polynomial fitting for fringe peak detection of white light scanning interferograms", Opt. Eng, 39(4), pp. 952-959 (2000).

Pelligrand, S. et al., "Mesures 3D de topographies et de vibrations a l'echelle (sub)micrometrique par microscopie optique interferometrique", Proc. Club CMOI, Methodes et Techniques Optiques pour l'Industrie (2002).

Peng, S.T., et al., "Theory of Periodic Dielect Waveguides," IEEE Trans Microwave Theory and Technique MTT-23(1), 123-133 (1975).

Pfortner et al., "Red-green-blue interferometer for the metrology of discontinuous structures", Applied Optics, vol. 42, No. 4, pp. 667-673 (Feb. 1, 2003).

Pluta, Maksymilian, "Advanced Light Microscopy", vol. 3, (Elsevier, Amsterdam, 1993) pp. 265-271.

Press et al., "Linear Correlation", Numerical Recipes in C, Cambridge University Press, 2.sup.nd Edition, pp. 636-639 (1992).

Raymond, C.J., "Scatterometry for Semiconductor Metrology," in Handbook of silicon semiconductor metrology, A.J. Deibold, Ed. (Marcel Dekker, Inc., New York 2001).

Raymond, et al., "Scatterometry for CD measurements of etched structures," SPIE 2725, 720-728 (1996).

Rosencwaig, Allan et al., "Beam profile reflectometry: A new technique for dielectric film measurements", Applied Physics Letters, vol. 60, No. 11, pp. 1301-1303 (Mar. 16, 1992).

Sandoz et al., "High-resolution profilometry by using phase calculation algorithms for spectroscopic analysis of white-light interferograms", Journal of Modern Optics, vol. 43, No. 4 , pp. 701-708 (1996).

Sandoz et al., "Optical implementation of frequency domain analysis for white light interferometry", Proceedings SPIE, vol. 2545, pp. 221-228 (Jun. 1995).

Sandoz et al., "Processing of white light correlograms: simultaneous pahse and envelope measurements by wavelet transformation", SPIE, 3098, pp. 73-82 (1997).

Sandoz, Patrick "Wavelet transform as a processing tool in white-light interferometry", Optics Letters, vol. 22, No. 14, pp. 1065-1067 (Jul. 15, 1997).

Schmit, J. et al., "Extended averaging technique for derivation of error-compensating algorithms in phase-shifting interferometry," Applied Optics, vol. 34:19, pp. 3610-3619 (Jul. 1, 1995).

Schnell et al., "Dispersive white-light interferometry for absolute distance measurement with dielectric multilayer systems on the target", Optics Letters, vol. 21, No. 7, pp. 528-530 (Apr. 1996).

Schwider et al., "Dispersive interferometric profilometer", Optics Letters, vol. 19, No. 13, pp. 995-997 (Jul. 1994).

See et al., "Scanning optical microellipsometer for pure surface profiling", Applied Optics, vol. 35, No. 34, pp. 6663-6668 (Dec. 1, 1996). cited by other.

Shatalin, S. V. et al., "Reflection conoscopy and micro-ellipsometry of isotropic thin film structures", Journal of Microscopy, vol. 179, Part 3, pp. 241-252 (Sep. 1995).

Sheppard et al., "Effect of numerical aperture on interference fringe spacing", Applied Optics, vol. 34, No. 22, pp. 4731-4734 (Aug. 1, 1995).

Totzeck, "Numerical simulation of high-NA quantitative polarization microscopy and corresponding near-fields", Optik, vol. 112, No. 9, pp. 399-406 (2001).

Tripathi et al., "Spectral shaping for non-Gaussian source spectra in optical coherence tomography", Optics Letters, vol. 27, No. 6, pp. 406-408 (2002).

Tzannes et al., Measurement of the modulation transfer function of infrared cameras, Optical Engineering, vol. 34, No. 6, pp. 1808-1817 (Jun. 1995). cited by other.

Willenborg et al, "A novel micro-spot dielectric film thickness measurement system", SPIE, vol. 1594, pp. 322-333 (1991).

Wyant, "Phase shifting interferometry" (1998).

Youngquist, R. C. Carr, S. and Davies, D. E. N., "Optical Coherence-Domain Reflectometry: a New Optical Evaluation Technique", Optical Letters, Mar. 1987, vol. 12, No. 3.

Zhan, Q., et al., "Measurement of surface features beyond the diffraction limit with an imaging ellipsometer," Opt. Lett. 27, 821-823 (2002).

PCT Search Report dated Jun. 10, 2008 by ISA/RO Examiner Lee W. Young.

Max Born & Emil Wolf, "Principles of Optics" Electromagnetic Theory of Propagation Interference and Diffraction of Light, Sixth (Corrected) Edition, Chapters VI and VII, pp. 233-371, 1993.

Hart, David G. Vass, and Begbie, Mark L., "Fast surface profiling by spectral analysis of white-light interferograms with Fourier transform spectroscopy", Applied Optics, vol. 37, No. 10 (Apr. 1998).

* cited by examiner though the surface of interest and the reference surface to produce an interferogram. Fringes in the interferogram are indicative of spatial variations between the surface of interest and the reference surface.

INTERFEROMETRY METHOD AND SYSTEM INCLUDING SPECTRAL DECOMPOSITION

CROSS-REFERENCE TO RELATED APPLICATIONS

This application claims priority to Provisional Patent Application No. 60/726,005, entitled "INTERFEROMETRY METHOD AND SYSTEM INCLUDING SPECTRAL DECOMPOSITION," filed on Oct. 11, 2005, the entire contents of which is incorporated herein by reference.

BACKGROUND

Interferometric techniques are commonly used to measure the profile of a surface of an object. To do so, an interferometer combines a measurement wavefront reflected from the surface of interest with a reference wavefront reflected from a reference surface to produce an interferogram. Fringes in the interferogram are indicative of spatial variations between the surface of interest and the reference surface.

A scanning interferometer scans the optical path length difference (OPD) between the reference and measurement legs of the interferometer over a range comparable to, or larger than, the coherence length of the interfering wavefronts, to produce a scanning interferometry signal for each camera pixel used to measure the interferogram. A limited (or "low") coherence length can be produced, for example, by using a broadband light source (e.g., a white light source), which is referred to as scanning white light interferometry (SWLI). A typical SWLI signal is a few fringes localized near the zero optical path length difference (OPD) position. The signal is typically characterized by a sinusoidal carrier modulation (the "fringes") with bell-shaped fringe-contrast envelope. The conventional idea underlying SWLI metrology is to make use of the localization of the fringes to measure surface profiles. Low-coherence interferometry signals can also be produced with narrow band light that illuminates an object over a wide range of angles, such as, for example, in imaging interferometers that have a high numerical aperture.

Techniques for processing low-coherence interferometry signals include two principle trends. The first approach is to locate the peak or center of the envelope, assuming that this position corresponds to the zero optical path length difference (OPD) of a two-beam interferometer for which one beam reflects from the measurement surface. The second approach is to transform the signal into the frequency domain and calculate the rate of change of phase with wavelength, assuming that an essentially linear slope is directly proportional to object position. See, for example, U.S. Pat. No. 5,398,113 to Peter de Groot, the entire contents of which are incorporated herein by reference. This latter approach is referred to as Frequency Domain Analysis (FDA).

Unfortunately such assumptions may break down when applied to a measurement object having a thin film because of reflections by the top surface and the underlying film/substrate interface. Recently a method was disclosed in U.S. Pat. No. 6,545,763 to S. W. Kim and G. H. Kim to address such structures. The method fit the frequency domain phase profile of a SWLI signal for the thin film structure to an estimated frequency domain phase profile for various film thicknesses and surface heights. A simultaneous optimization determined the correct film thickness and surface height.

One useful application of such surface profiling techniques is the profiling of lithography wafers covered with photoresist. The goal in this case is to determine the topography of the top surface of the photoresist over a patterned substrate and to provide information about the location of this surface with respect to some system datum, one application of which is to establish the position of best focus during the photolithographic process. See, for example, commonly owned U.S. Patent Application Publication No. 2005/0057757 A1 entitled "LOW COHERENCE GRAZING INCIDENCE INTERFEROMETRY SYSTEMS AND METHODS" by Xavier Colonna de Lega et al., the contents of which are incorporated herein by reference.

SUMMARY

This disclosure relates to using interferometry to measure spatial information and/or other characteristics of objects. The objects can include a complex surface structure, such as thin film(s), discrete structures of dissimilar materials, or discrete structures that are underresolved by the optical resolution of an interference microscope. Such measurements are relevant to the characterization of flat panel display components, semiconductor wafer metrology, and in-situ thin film and dissimilar materials analysis, for example.

In embodiments disclosed herein, spatial information of a measurement surface (also referred to as the object or measurement surface), such as the top surface of a thin film structure, is established using white-light grazing incidence interferometry with detection in the spectral domain. The disclosed systems and methods are suitable for determining the location and orientation (piston, tip and tilt with respect to the interferometer) of a measurement surface that may be covered by a thin film structure (e.g., a photoresist on substrate, which may itself include one or more layers). Such information can be used, for example, to optimally position a photoresist on wafer with respect to a photolithography tool.

Typically, in embodiments, the interferometer uses a spectrally broadband and/or spatially extended light source, which results in an interference pattern that has significantly reduced sensitivity to the influence of the underlying layers in the case of a coated surface compared to a monochromatic point source. Another aspect of the interferometer is the use of a 2-dimensional multi-element detector to map with a single exposure the topography of a line of points on a measurement surface. One dimension on the detector corresponds to the line of object positions while the other dimension corresponds to a range of wavenumbers of the light source.

The use of grazing incidence can provide an un-obscured view of the measurement surface, allowing other sensors (e.g., an alignment scope in the photolithography tool) to observe the object near normal incidence.

Additional camera exposures can be recorded for different measurement surface locations, providing spatial information about a two-dimensional area of the measurement surface instead of a single line.

In certain embodiments, the light source spectrum can include a number of sharp emission lines that are used to provide calibration information for the optical system.

In some embodiments, the light is linearly polarized in the plane of incidence, illuminating the measurement surface at or near Brewster's angle. In this case the substrate surface itself, rather than the top surface of the thin film on the substrate, is profiled by the interferometer.

Various aspects of the invention are summarized as follows.

In general, in one aspect, the invention features an interferometry method including:

(i) combining reference light with measurement light reflected from a line of points on a measurement surface, wherein the measurement light and the reference light are derived from a common source; (ii) directing the combined light onto a detector to image the line of points on the measurement surface along a first dimension of the detector and to spectrally disperse the combined light corresponding to each point along a second dimension of the detector; and (iii) analyzing the spectrally dispersed light to determine spatial information about the measurement surface along the line of points.

Embodiments of the method may include any of the following features.

The method may further include providing a difference in optical path from the source to the detector between the measurement light and the reference light, wherein the difference in optical path and the range of frequencies produced by the common source are large enough to produce a series of intensity peaks in the spectrally dispersed light along the second dimension of the detector. For example, at least three of the peaks in the series have an intensity greater than half of the intensity of the most-intense peak in the series.

The method may further include analyzing the spectrally dispersed light includes transforming intensity information (e.g., by Fourier transformation) about the spectrally dispersed light from each point on the line to produce an interference signal. For example, analyzing the spectrally dispersed light may further include analyzing the interference signal for each point on the line to determine surface height variations along the line of the measurement surface. Furthermore, the measurement surface may be on a measurement object including a thin film on a substrate, and analyzing the interference signal for each point on the line may include selecting a subset of the interference signal corresponding to the top surface of the thin film and analyzing the subset to determine a relative surface height for each point on the top surface of the thin film along the line.

The measurement surface may be on a measurement object including a thin film on a substrate (which itself may include one or more layers). The spatial information may correspond, for example, to a relative height profile for the top surface of the thin film. Alternatively, the spatial information may correspond, for example, to a relative height profile for the interface between the thin film and the substrate. For example, in the latter case, the measurement light may be selected to have a polarization and to be directed to be incident on the top surface of the thin film at an angle that cause it to substantially completely transmit through the top surface of the thin film and reflect from the interface between the thin film and the substrate (e.g., a Brewster's angle).

The measurement and reference light may be in the visible region of the electromagnetic spectrum. Alternatively, the measurement and reference light may be outside the visible region of the electromagnetic spectrum. Specifically, by using the word "light" we do not mean to limit electromagnetic radiation to that that is visible.

The method may further include combining of the measurement and reference light using a grazing-incidence interferometer. For example, the measurement light may be directed to the measurement surface at an angle of incidence of about 60°, such as about 75° or more.

The common source may be a broadband light source. For example, the broadband light source may provide light over a range of about 50 nm or more, such as about 100 nm or more).

The measurement light may be selected to have a polarization and to be directed to be incident on the top surface of the thin film at an angle that cause it to substantially completely transmit through the top surface of the thin film and reflect from the interface between the thin film and the substrate (e.g., a Brewster's angle).

A dispersive optical element, such as a diffraction grating or a prism, may be used to spectrally disperse the combined light along the second dimension of the detector.

The method may further include separating input light from the common source into the measurement and reference light. Furthermore, the method may further include reflecting the reference light from multiple mirrors after separating it from the input light and before combining it with the measurement light.

The measurement light may be directed to the measurement surface from the side of the measurement surface, and the method may further include using a photolithography tool to expose from above a photoresist at the measurement surface. For example, an alignment microscope to position the measurement surface relative to the photolithography tool. Also, the method may further include adjusting the angular orientation of the measurement surface relative to the photolithography tool based on the spatial information about the measurement surface along the line of points determined by analyzing the spectrally dispersed light.

The measurement light may be directed to the line of points on the measurement surface by a fiber array. Furthermore, the measurement light and reference light may be combined with a second fiber array.

The method of claim may further include providing the common source to emit light over a range of frequencies having multiple narrow-band emission peaks, and correlating the locations of the spectrally dispersed light along the second dimension of the detector with the spectral locations of the multiple narrow-band emission peaks to assist in the analysis of the spectrally dispersed light.

The method may further include repeating each of the steps for a different line of points on the measurement surface.

In general, in another aspect, the invention features an interferometry system including: (i) an interferometry system configured to combine reference light with measurement light reflected from a line of points on a measurement surface, wherein the measurement light and the reference light are derived from a common source, and direct the combined light onto a detector to image the line of points on the measurement surface along a first dimension of the detector and to spectrally disperse the combined light corresponding to each point along a second dimension of the detector; and (ii) an electronic processor configured to analyze the spectrally dispersed light to determine spatial information about the measurement surface along the line of points.

Embodiments of the apparatus may include any feature corresponding to those described above with reference to the method.

In general, in a further aspect, the invention features a method that includes directing measurement light to reflect from a measurement surface and combining the reflected measurement light with reference light, where the measurement light and reference light are derived from a common source, and there is a non-zero optical path length difference between the measurement light and reference light that is greater than a coherence length of the measurement light. The method further includes spectrally dispersing the combined light onto a multi-element detector to detect a spatially-varying intensity pattern, determining spatial information about the measurement surface based on the spatially-varying intensity pattern, and outputting the spatial information.

Implementations of the method can include one or more of the following features. For example, determining the spatial information can include performing a spatial-frequency transform of the spatially-varying intensity pattern and spatial information is determined based on the spatial-frequency transform, such as a Fourier transform. The spatial-frequency transform can provide a corresponding interference signal for each of a number of points of the measurement surface and determining the spatial information comprises analyzing a portion of each interference signal corresponding to a non-zero optical path length difference between the measurement light and reference light. The spatial-frequency transform can be performed for each of a plurality of one-dimensional sections of the spatially-varying intensity pattern to provide a corresponding interference signal for each section. In some embodiments, each interference signal is related to an optical path length difference between the reference light and measurement light reflected from a point on a line on the measurement surface corresponding to the section of the spatially-varying intensity pattern from which the interference signal is derived.

The spatial information can be information about a line of points on the measurement surface where measurement light reflected from the line of points is directed to a corresponding line of elements of the multi-element detector extending along a first dimension of the detector. The measurement light reflected from each point on the line of points can be spectrally dispersed across a corresponding line of elements of the multi-element detector extending along a second dimension of the detector. The position of each detector element along the second dimension of the detector can correspond to a wavenumber of the measurement light. Determining the spatial information can include performing a spatial-frequency transform for each point by transforming an intensity profile from the corresponding line of elements of the multi-element detector to produce an interference signal. The interference signal for each point can include information about the optical path length difference between measurement light reflected from the point and the reference light combined with the measurement light reflected from the point. The spatial information can be determined by analyzing the interference signal for each point to determine surface height variations along the line of points on the measurement surface. The measurement surface can be on a measurement object comprising a thin film on a substrate, and wherein analyzing the interference signal for each point on the line comprises selecting a subset of the interference signal corresponding to the top surface of the thin film and analyzing the subset to determine a relative surface height for each point of the top surface of the thin film along the line.

The measurement light can have a coherence length that is less than the non-zero optical path length difference between the measurement light and the reference light. The measurement light can be broadband measurement light.

The measurement light can be directed to reflect from the measurement surface at a grazing angle of incidence. The measurement light can directed to reflect from the measurement surface at an angle of incidence of about 60° or more.

In some embodiments, the measurement surface is on a measurement object comprising a thin film on a substrate. The spatial information can correspond to a relative height profile for a surface of the thin film opposite the substrate. The spatial information can correspond to a relative height profile of a surface of the thin film adjacent the substrate.

The measurement light can be in the visible region of the electromagnetic spectrum and/or outside the visible region of the electromagnetic spectrum. The measurement light can have a spectral bandwidth of about 50 nm or more.

In general, in another aspect, the invention features a method that includes directing measurement light to reflect from a measurement surface at a grazing angle of incidence and combining the reflected measurement light with reference light, where the measurement light and reference light are derived from a common source. The method further includes spectrally dispersing the combined light onto a multi-element detector to detect a spatially-varying intensity pattern, determining spatial information about the measurement surface based on the spatially-varying intensity pattern, and outputting the spatial information. Implementations of the method can include any of the features mentioned in regard to other aspects.

In general, in a further aspect, the invention features a method that includes directing measurement light to reflect from a measurement surface at a grazing angle of incidence and combining the reflected measurement light with reference light, where the measurement light and reference light are derived from a common source. The method further includes spectrally dispersing the combined light onto a multi-element detector to detect a spatially-varying intensity pattern, performing a spatial-frequency transform of the spatially-varying intensity pattern, determining spatial information about the measurement surface based on the spatial-frequency transform of the spatially-varying intensity pattern, and outputting the spatial information. Implementations of the method can include any of the features mentioned in regard to other aspects.

In general, in another aspect, the invention features a method that includes directing measurement light to reflect from a measurement surface and combining the reflected measurement light with reference light, where the measurement light and reference light are derived from a common source. The method further includes spectrally dispersing the combined light onto a multi-element detector to detect a spatially-varying intensity pattern, determining an interference signal for each of a plurality of one-dimensional sections of the spatially-varying intensity pattern, determining spatial information about the measurement surface based on the interference signals, and outputting the spatial information. Implementations of the method can include any of the features mentioned in regard to other aspects.

In general, in a further aspect, the invention features a method that includes directing measurement light to reflect from a measurement surface and combining the reflected measurement light with reference light, where the measurement light and reference light are derived from a common source. The method further includes spectrally dispersing the combined light onto a multi-element detector to detect a spatially-varying intensity pattern, performing a spatial-frequency transform of the spatially-varying intensity pattern, determining spatial information about the measurement surface based on the spatial-frequency transform, and outputting the spatial information. Implementations of the method can include any of the features mentioned in regard to other aspects.

In general, in another aspect, the invention features a system that includes a light source being configured to produce input light during operation of the system, a multi-element detector, and an interferometer configured to derive measurement light and reference light from the input light, illuminate a section of a measurement surface with the measurement light, combine the reference light with the measurement light reflected the measurement surface, and direct the combined light onto the detector to provide a spatially-varying intensity pattern on the detector elements. The input light has a finite coherence length and the interferometer introduces an optical path length difference between the measurement light and the reference light that is greater than the coherence length of the input light. The system also includes an electronic processor in communication with the detector, the electronic processor being configured to determine spatial information about the measurement surface based on the spatially-varying intensity pattern.

Embodiments of the system can include one or more of the following features. For example, the electronic processor can be configured to perform a spatial-frequency transform of the spatially-varying intensity pattern and to determine the spatial information about the measurement surface based on the spatial-frequency transform.

The light source can be a broadband light source. The light source can be a spatially-extended light source.

The interferometer can include optical elements (e.g., lenses and/or mirrors) configured to image the light source to the detector. The optical elements can image the light source to the measurement surface and reimage the light source from the measurement surface to the detector. The interferometer can be configured to preserve a relative orientation of the images of the light source at the detector formed by the measurement light and reference light, respectively.

The multi-element detector can include a two-dimensional array of detector elements and the dispersive optical element is configured to spectrally disperse the combined light along one of the array dimensions.

The dispersive optical element can include a grating (e.g., a transmission or reflection grating). The dispersive optical element can include a prism.

The interferometer can direct the measurement light to the measurement surface at a grazing angle of incidence. The interferometer can include a beam splitter positioned to separate the input light into the test and reference light. The interferometer can include multiple mirrors positioned to reflect the reference light after separating it from the input light and before combining it with the measurement light.

The interferometer can be configured to direct the measurement light to the measurement surface from the side of the measurement surface, and the system can further include a photolithography tool configured to expose the measurement surface to radiation. The system can include an alignment microscope for positioning the measurement surface relative to the photolithography tool. The electronic processor can be configured to cause an adjustment of the angular orientation of the measurement surface relative to the photolithography tool based on the spatial information.

In some embodiments, the interferometer includes a fiber array positioned to direct the measurement light to the measurement surface by a fiber array. The interferometer can further include a second fiber array positioned to combine the measurement light and reference light.

The interferometer and electronic processor can be configured to repeat the analysis for additional locations of the measurement surface to determine spatial information about different portions of the measurement surface.

In general, in another aspect, the invention features a system that includes a light source configured to produce input light during operation of the system, a multi-element detector, a dispersive optical element, and an interferometer configured to derive measurement light and reference light from the input light, illuminate a measurement surface with the measurement light at a grazing angle of incidence, combine the reference light with the measurement light reflected from the measurement surface, and direct the combined light to the dispersive optical element which spectrally disperses the combined light onto the detector to provide a spatially-varying intensity pattern on the detector elements. The system also includes an electronic processor in communication with the detector, the electronic processor being configured to determine spatial information about the measurement surface based on the spatially-varying intensity pattern during operation of the system. Embodiments of the system can include any of the features mentioned in relation to the other systems and/or may be configured to implement the above-mentioned methods.

In general, in a further aspect, the invention features a system that includes a light source configured to produce input light during operation of the system, a multi-element detector, and an interferometer configured to derive measurement light and reference light from the input light, illuminate a section of a measurement surface comprising a plurality of locations with the measurement light at a grazing angle of incidence, combine the reference light with the measurement light reflected from the locations of the measurement surface, and direct the combined light onto the detector to provide a spatially-varying intensity pattern on the detector elements. The interferometer directs measurement light from each location of the measurement surface to a plurality of the detector elements. The system also includes an electronic processor in communication with the detector, the electronic processor being configured to perform, for each location of the measurement surface, a spatial-frequency transform of the spatially-varying intensity distribution across the corresponding detector elements and determine spatial information about the section of the measurement surface based on the spatial frequency transforms. Embodiments of the system can include any of the features mentioned in relation to the other systems and/or may be configured to implement the above-mentioned methods.

In general, in another aspect, the invention features a system that includes a light source configured to produce input light during operation of the system, a multi-element detector, and an interferometer configured to derive measurement light and reference light from the input light, illuminate a section of a measurement surface comprising a plurality of locations with the measurement light, combine the reference light with the measurement light reflected the measurement surface, and direct the combined light onto the detector to provide a spatially-varying intensity pattern on the detector elements. The system also includes an electronic processor in communication with the detector, the electronic processor being configured to determine, for each location of the measurement surface, an interference signal from the spatially-varying intensity distribution across the corresponding detector elements and determine spatial information about the section of the measurement surface based on the interference signals. Embodiments of the system can include any of the features mentioned in relation to the other systems and/or may be configured to implement the above-mentioned methods.

In general, in another aspect, the invention features a system that includes a light source configured to produce input light during operation of the system, a multi-element detector, a dispersive optical element, and an interferometer configured to derive measurement light and reference light from the input light, illuminate a measurement surface with the measurement light, combines the reference light with the measurement light reflected from the measurement surface, and direct the combined light to the dispersive optical element which spectrally disperses the combined light onto the detector to detect a spatially-varying intensity pattern. The system also includes an electronic processor in communication with the detector, the electronic processor being configured to perform a spatial-frequency transform of the spatially-varying intensity pattern and determine spatial information about the measurement surface based on the spatial-frequency transform. Embodiments of the system can include any of the features mentioned in relation to the other systems and/or may be configured to implement the above-mentioned methods.

Other features and advantages will be apparent from the following detailed description.

A number of documents are incorporated herein by reference. In case of conflict, the present application will control.

BRIEF DESCRIPTION OF THE DRAWINGS

FIGS. 9A and 9B show the structure before and after planarization, respectively.

FIG. 10A shows the structure before addition of solder. FIG. 10B shows the structure after addition of solder but prior to flowing the solder.

DETAILED DESCRIPTION

Figure 1A:
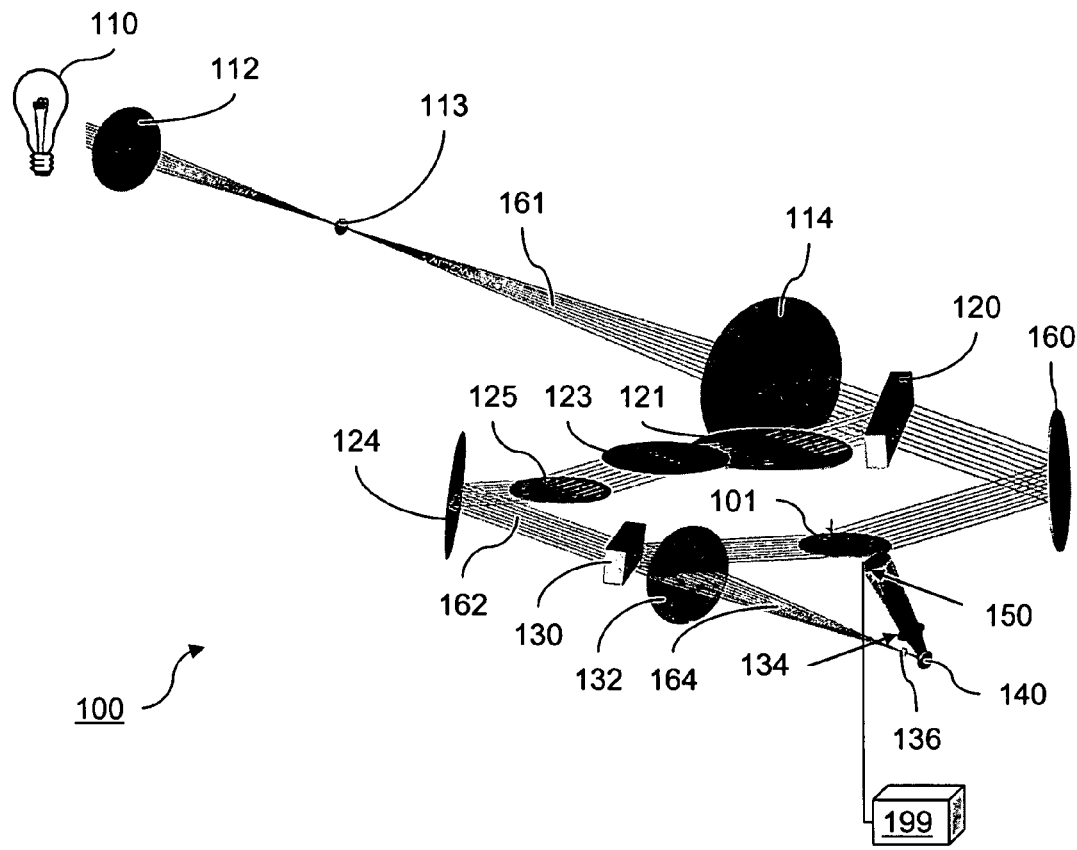
FIG. 1A is a perspective view of an embodiment of an grazing-incidence interferometry system.

Referring to FIG. 1A, a grazing-incidence interferometry system 100 includes a broadband light source 110, lenses 112, 114, 132 and 134, a beam splitter 120, mirrors 121, 122, 123, and 125, a beam combiner 130, a diffraction grating 140, and a detector 150. Lenses 112 and 114 form a telecentric imaging system that images light source 110 onto a measurement surface an object 101. An aperture stop 113 is positioned between lenses 112 and 114. Lenses 132 and 134 form a telecentric imaging system that images the measurement surface onto detector 150. Generally, the numerical aperture (NA) of the imaging system at detector 150 can vary. Typically, the NA is relatively small (e.g., about 0.1 or less, about 0.05 or less, about 0.01 or less). In general, the light from light source 110 can be polarized (e.g., linearly polarized) or unpolarized.

Light from light source 110 propagates as an input beam 161, that is split into a measurement beam 160 and a reference beam 162 by beam splitter 120. After measurement beam 160 reflects from the measurement surface of object 101, it is recombined with reference beam 162 by beam combiner 130. The system is arranged so that there is a non-zero optical path length difference between measurement beam 160 and reference beam 162. Combined beam 164 is directed to a diffraction grating 140, which reflects combined beam 164 and spectrally disperses the beam onto detector 150. The spectral dispersion of combined beam 164 is also referred to as spectral decomposition. The light in combined beam 164 from measurement beam 160 and reference beam 162 interfere at the surface of detector 150 producing a series of intensity fringes across the detector.

As a result of broadband light source 110, system 100 has a relatively low coherence length and interferometry system 100 introduces a non-zero optical path length difference between measurement beam 160 and reference beam 162 that is larger than a coherence length of the system.

The telecentric imaging systems that image light source 110 onto the measurement surface and onto detector 150 are arranged to preserve the relative orientation of the respective images of light source 110 formed from the measurement light and reference light at detector 150. This preserves coherence of the measurement and reference light from different portions of the extended source at the detector, so that the beams can form an interference pattern for certain optical path length difference between the measurement and reference light.

Figure 1B:
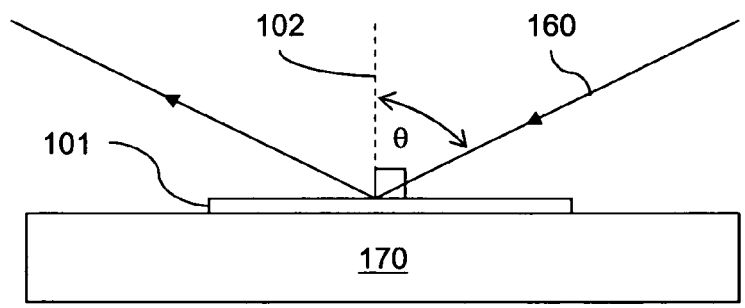
FIG. 1B is a side view of a portion of the grazing-incidence interferometry system shown in FIG. 1A.

Referring also to FIG. 1B, object 101 is supported by a stage 170, which can be a movable stage. FIG. 1B also shows the path of measurement beam 160 relative to the surface normal of object 101. Being a grazing angle incidence interferometer, the chief rays of the system are incident on the measurement surface with a non-zero angle of incidence, $\theta$. In some embodiments, $\theta$ can be relatively large. For example, $\theta$ can be about 45° or more (e.g., about 60° or more, about 75° or more). The grazing-incidence geometry provides a working space directly above the measurement surface, allowing other instruments to be placed in close proximity to the measurement surface. For example, in some embodiments, a microscope, such as an alignment microscope, can be positioned to study the measurement surface while the measurement surface is in the path of measurement beam 160.

Detector 150 is a multi-element detector, such as a charge coupled device (CCD) array or a complimentary metal-oxide-semiconductor (CMOS) array. In general, the type of detector depends on the spectral content of the light used by the system. For example, both CCD and CMOS detectors can be suitable for light in the visible region and/or infrared region of the electromagnetic spectrum.

Light source 110 is a spatially-extended broadband light source. In particular, light source 110 extends in one direction so that is illuminates a line of points on the measurement surface. For example, light source 110 can be composed of a plurality of point sources (e.g., light emitting diodes) or an extended single source (e.g., an extended fluorescent bulb). More generally, in some embodiments, a point source, rather than a spatially-extended source, can be used.

Moreover, while system 100 images source 110 to detector 150, in general, other configurations are also possible. For example, in some embodiments, system 100 can image light from a pupil plane of the system to the detector. In certain embodiments, system 100 can include an aperture stop (e.g., positioned at or near a pupil plane) that defines an illumination pattern at the measurement surface. For example, a slit-shaped aperture stop can be used to define a spatially-extended source. In general, embodiments can include additional optical components (e.g., spectral and/or spatial filters, homogenizing optics) for manipulating light from the light source to provide a desired illumination pattern at the measurement surface and/or at the detector.

In general, while light source 110 is a broadband light source, the spectral bandwidth of light source 110 can vary. The spectral bandwidth refers to the full width at half maximum of the emission spectrum of the light source. In some embodiments, the spectral bandwidth of the light source can be about 20 nm or more (e.g., about 50 nm or more, about 100 nm or more, about 150 nm or more, about 200 nm or more, about 250 nm or more, about 300 nm or more). The emission spectrum can include light in the visible portion of the electromagnetic spectrum and/or outside the visible portion of the electromagnetic spectrum (e.g., in the infrared and/or ultraviolet portions of the electromagnetic spectrum).

Diffraction grating 140 and the imaging system including lenses 132 and 134 are arranged relative to detector 150 so that light reflected from the line of points illuminated by light source 110 on the measurement surface in combined beam 164 is dispersed as a function of wavenumber along one dimension of detector 150. The optical components are further arranged so that the orthogonal dimension of detector 150 corresponds to different points along the line on the measurement surface. This arrangement is illustrated by the axes in the FIG. 2A, where the intensity as a function of wavenumber corresponds to the source spectrum. Where the optical path length difference between the measurement beam 160 and reference beam 162 is much smaller than the wavelength of the light, $\lambda'$ (i.e., the central wavelength of a Gaussian fit to the spectrum of the source), the interference phenomenon at detector 150 is constructive for all light wavelengths and the measured light distribution is similar to that shown in FIG. 2A.

Figure 2A:
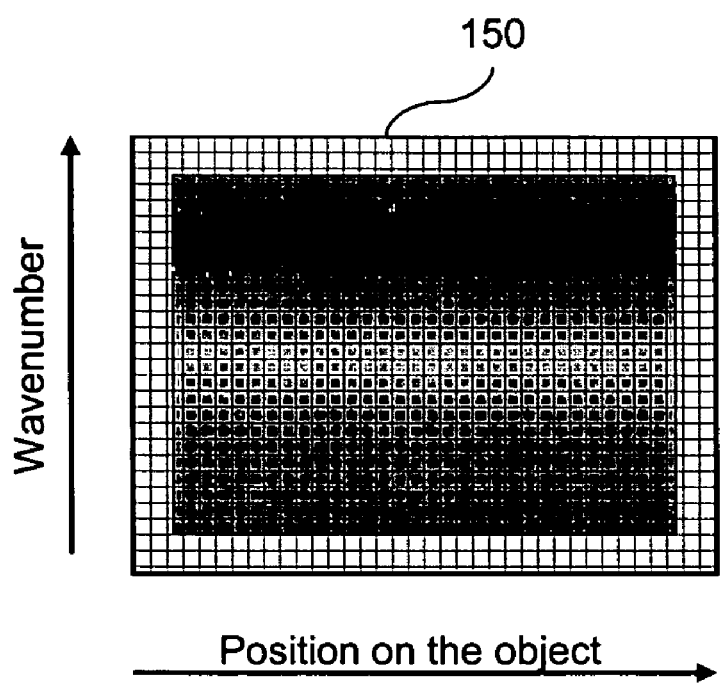
FIG. 2A is a plan view of a detector showing a spectrally-decomposed light intensity pattern.
Figure 2B:
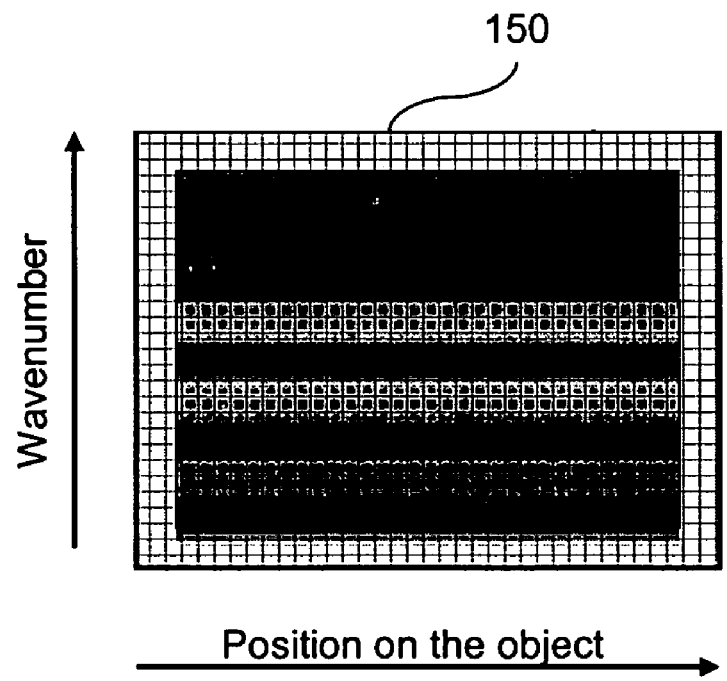
FIG. 2B is a plan view of a detector showing a spectrally-decomposed light intensity pattern modulated by an interference pattern.

However, an optical path length difference, δ, between measurement beam 160 and reference beam 162 the is one the order of the wavelength, $\lambda'$, of the light or larger, results in constructive interference for those wavelengths λ such that δ=pλ where p is an integer number and destructive interference for those wavelengths such that δ=(p+1:2)λ. The resulting spatially-varying light intensity distribution is shown schematically in FIG. 2B, in which the spectral distribution shown in FIG. 2A is modulated by a series of intensity fringes. The optical path length difference, δ, can be varied by displacing one of the reference mirrors 121, 123, and/or 125 in a direction orthogonal to the plane of the mirror, and/or displacing object 101 in a the direction of surface normal 102. For example, in some embodiments, one or more of reference mirrors 121, 123, and/or 125 can be affixed to an adjustable mount, which is configured to provide a user with the ability to modify δ.

Detector 150 is in communication with an electronic processor 199, which analyzes intensity information from the detector to determine spatial information about the measurement surface of object 101. In some embodiments, the location of interference extrema is used to estimate the optical path length difference at each location along the illuminated line on the object.

For example, in some embodiments, one can use a dense channel spectrum and apply "spatial-carrier" phase measurement techniques to calculate a phase variation as a function of wavelength, the slope of which is proportional to the optical path length difference. Spatial-carrier phase measurement techniques are described, for example, in commonly-owned U.S. Patent Publication No. US-2006-0187465 A1, entitled "INTERFEROMETRY SYSTEMS AND METHODS," filed on Feb. 15, 2006, the entire contents of which are incorporated herein by reference.

In some embodiments, spatial information about the measurement surface is determined from a spatial-frequency transform (e.g., a Fourier transform such as a Discrete Fourier transform, a Laplace transform, a Hilbert transform) of the intensity information from each column of detector elements. For example, the intensity distribution for each column of detector elements can be Fourier transformed, yielding an interference signal as a function of optical path length difference. The location of a signal of interest, corresponding to the interference signal due to measurement light reflecting from the measurement surface, is directly proportional to the optical path length difference in the interferometer, δ. Accordingly, spatial information about the measurement surface can be extracted from the interference signal using conventional techniques developed for SWLI interference signals that are acquired, for example, by mechanical phase shifting.

Figure 3:
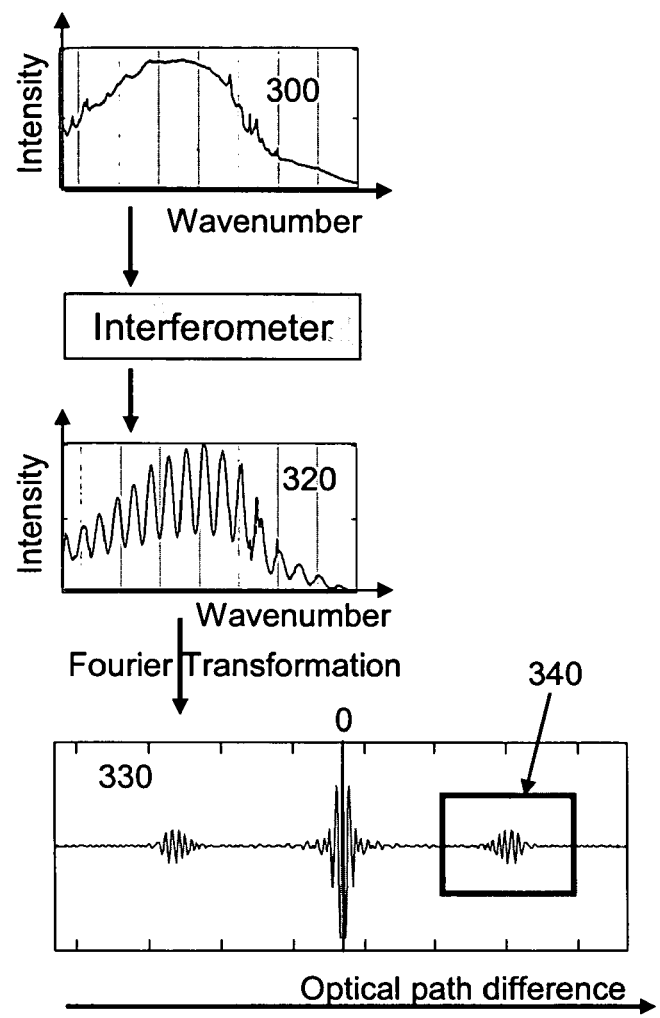
FIG. 3 is a schematic flow diagram showing steps for acquiring an interference signal.

For such cases, the overall measurement principle is illustrated in FIG. 3. Broadband light from source 10 has an emission spectrum shown, for example, by spectrum 300. In spectrum 300, the relative intensity is shown as a function of wavenumber, k, where a wavenumber is defined as k=2π/λ, for a wavelength λ in the emission spectrum. The spectrum measured by detector 150 for one object point is shown as spectrum 320. Spectrum 320 includes a number of intensity fringes that modulate the spectral profile of the source. Spectrum 320 corresponds to the intensity profile measured across a single column of detector elements. Each column of detector elements will measure a similar spectrum, corresponding to the different points in the line of the measurement surface imaged to the detector. Once the intensity distribution is measured for each detector element, electronic controller 199 Fourier transforms the spectrum to produce an interference signal as shown by signal 330. A portion of the intensity signal 340 is identified as the portion of the signal associate with the measurement surface.

It is believed, in theory, that the interference signal obtained by Fourier transforming the spectrally decomposed intensity profile is identical to an interference signal obtained, for example, using a mechanical scan. This equivalence is illustrated mathematically as follows. For a broadband emission spectrum, the interference signal measured on a detector during a mechanical scan over a range of optical path length differences is determined by summing over all wavelengths and can be expressed as $$I(z) = \int_0^\infty A(k) + B(k)\cos(2kz + \varphi(z))dk, \qquad (1)$$

where k is as defined previously, 2z is the optical path length difference between the measurement and reference arms of the interferometer, A(k) is the background light intensity, B(k) is the modulating intensity, φ(k) is a phase offset that includes all phase changes on transmission and reflection in the interferometer for the specific wavenumber, k. Note also that A(k) and B(k) are real functions and A(k)=B(k)=0 for all k<0. Eq. (1) can be rewritten as $$I(z) = \int_0^\infty A(k)dk + \text{Re}\left(\int_{-\infty}^\infty B(k) \cdot e^{i\varphi(k)} e^{i2kz} dk\right), \qquad (2)$$

and recognizing the second term as a Fourier transform, can be rewritten again as $$I(z) = \int_0^\infty A(k)dk + \text{Re}(FT(B(k)e^{i\varphi(k)})). \quad (3)$$

In the case of spectral decomposition, where the OPD between the measurement and reference beams is $2z_0$, the intensity at each wavenumber is given by the equation $$SI(k) = A(k) + B(k)\cos(k2z_0 + \phi(k)). \quad (4)$$

The Fourier transform of the intensity distribution, $SI(k)$, is given as $$I_{sd}(2z) = \text{Re}\left(\int_{-\infty}^\infty SI(k)e^{ik2z}dk\right), \quad (5)$$

which can be expanded as $$I_{sd}(2z) = \text{Re}\left(\int_{-\infty}^\infty A(k)e^{ik2z}dk + \frac{1}{2}\int_{-\infty}^\infty B(k)e^{i\varphi(k)}e^{ik2z_0}e^{ik2z}dk + \frac{1}{2}\int_{-\infty}^\infty B(k)e^{-i\varphi(k)}e^{-ik2z_0}e^{ik2z}dk\right), \quad (6)$$

and rewritten again as $$I_{sd}(2z) = \text{Re}(FT(a(k)) + \frac{1}{2}\text{Re}(FT(B(k)e^{i\varphi(k)})) * \Delta(2z_0) + \frac{1}{2}\text{Re}(FT(B(k)e^{-i\varphi(k)})) * \Delta(-2z_0), \quad (7)$$

where $\Delta$ is the Dirac distribution and $*$ is the convolution operator. It is noted that the second term on the right hand side of Eq. (7) corresponds to the modulation term of Eq. (2) convolved with a $\Delta$ distribution, which results in a shift of the location of the interference signal of interest. In other words, in theory, one can reconstruct the interference signal that would be obtained using a mechanical scan by Fourier transforming the spectral decomposition signal and selecting the relevant component of Eq. (7). Note that in order to effectively use this formalism to extract the contribution from the measurement surface to the interference signal, the offset $z_0$ should be larger than the width of the other terms in Eq. (7). In other words, the coherence length of the system should be less than the optical path length difference between the measurement and reference beams so that the modulation in the interference signal at $z_0$ is separated from the modulation at $z=0$. In general, the larger the value of $z_0$, the higher the frequency of region of interest of the interference signal will be. Also, the sign of the system is related to the sign of the optical path length difference. In other words, the sign of the system will change depending on whether the measurement beam path is larger than the reference beam path or vice versa.

Figure 4A:
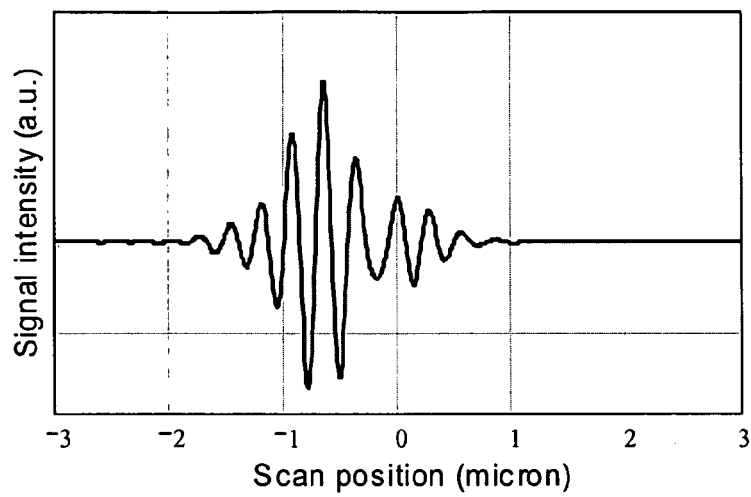
FIG. 4A is a plot of a simulated interference signal obtained by mechanical phase shifting.
Figure 4B:
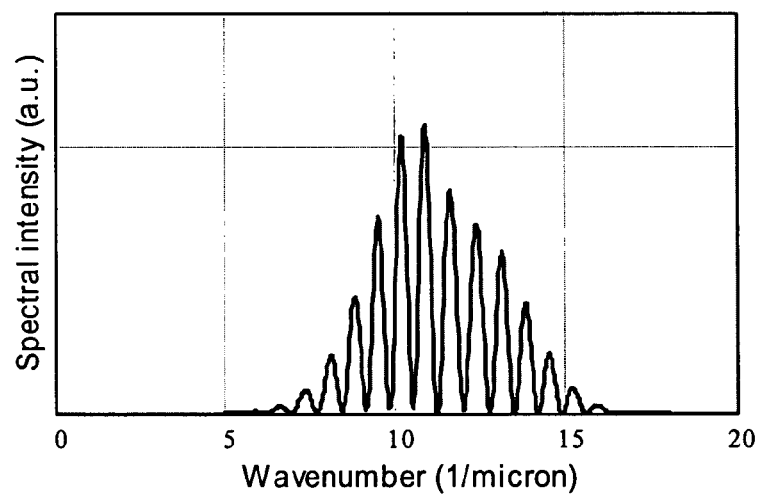
FIG. 4B is a plot of a simulated spatially-varying intensity pattern.
Figure 4C:
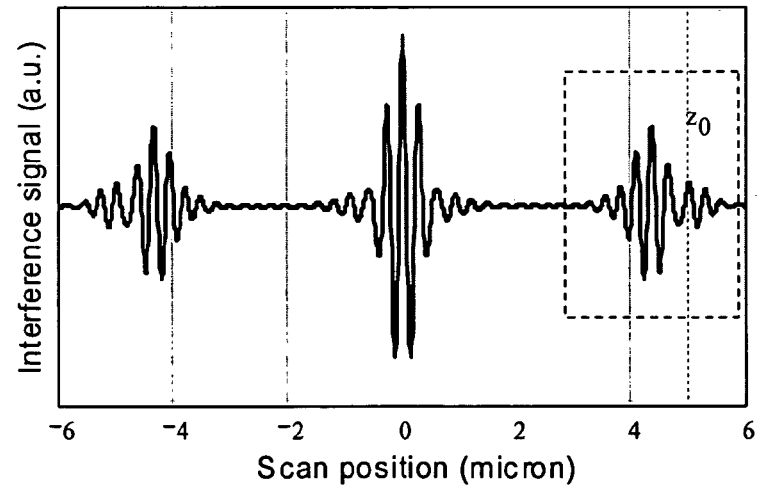
FIG. 4C is a plot of an interference signal obtained from the simulated spatially-varying intensity pattern shown in FIG. 4B.

Referring to FIGS. 4A-4C, the equivalence of an interference signal obtained by Fourier transforming a spectral decomposition signal and a conventionally-obtained interference signal is illustrated by a simulated signal for a 450 nm thick $SiO_2$ layer on a Cu substrate. For the purpose of the simulation, the interferometer had a sufficiently low NA that spatial coherence effects could be ignored, the chief rays of the interferometer were normally incident on the substrate surface, and the source had a central emission wavelength of 550 nm and a FWHM of 200 nm with a Gaussian shape as a function of k. FIG. 4A shows the simulated signal obtained using a mechanical scan calculated using Eq. (2). FIG. 4B shows the spectral decomposition intensity signal calculated using Eq. (3) for $z_0=5$ μm. FIG. 4C shows the Fourier transform of the signal shown in FIG. 4B. The portion of the signal corresponding to the measurement surface is indicated by the box located at $z=z_0$.

Since the interference signal obtained by transforming the spectrally decomposed intensity profile is effectively identical to an interference signal obtained using conventional scanning techniques (e.g., a mechanical scan), one can determine spatial information from the interference signal using algorithms developed for the conventionally-obtained interference signals.

U.S. patent applications published as US-2005-0078318-A1 entitled "METHODS AND SYSTEMS FOR INTERFEROMETRIC ANALYSIS OR SURFACES AND RELATED APPLICATIONS" and US-2005-0078319-A1 entitled "SURFACE PROFILING USING AN INTERFERENCE PATTERN MATCHING TEMPLATE, both by Peter J. de Groot, disclose techniques for analyzing interferometry signals from a thin film sample. One of the disclosed techniques is referred to as TopSlice and identifies the portion of the interferometry (SWLI) signal corresponding to the top-surface profile of a thin film structure. For a thin enough film, the individual signals corresponding to the upper and lower interfaces of the film are inseparable, in the sense that the fringe contrast has only one peak; nonetheless, one can argue on physical grounds that the first few fringes on the right most closely relate to the top-surface profile. TopSlice identifies the trumpet-shaped leading edge of the signal, and ascribes this to the top surface profile. A further technique disclosed in these published applications describes one way of locating the leading edge or other segment of a signal by using a pattern matching technique, one example of which is referred to as correlation template analysis (CTA). Both of said published applications are commonly-owned with the present applications and are incorporated herein by reference.

Additional methods for determining spatial information about the measurement surface are described in commonly-owned U.S. patent application Ser. No. 11/437,002, entitled "METHOD AND SYSTEM FOR ANALYZING LOW-COHERENCE INTERFEROMETRY SIGNALS FOR INFORMATION ABOUT THIN FILM STRUCTURES," filed on May 18, 2006, the entire contents of which are incorporated herein by reference. Methods disclosed in U.S. patent application Ser. No. 11/437,002 feature a sliding-window least-squares (LSQ) procedure for analyzing low-coherence interferometry signals. The procedure can be used to accurately identify portions of the low-coherence interferometry signals of interest. The procedure performs a fit sequentially through the scan by means of a least-squares optimization. The first step is to create a fitting function based on a model of the signal that we expect to see, then using one or more variable parameters, including an interference phase value, to optimize the fit to the actual signal at each scan position. The scan position for which the LSQ fit is more successful locates the signal, and the phase at this point is the desired final result.

In general, electronic processor can perform a variety of additional operations in the process of determining the spatial information about the measurement surface. For example, in some embodiments, the spectral distribution measured by the detector is resampled (e.g., by interpolation of spatially-varying intensity pattern data) if needed to provide spectral sampling with a fixed wavenumber increment Δk between adjacent detector elements in each column of elements.

In some embodiments, the electronic processing can include operations that reduce or eliminate certain system errors, including, for example, source spectrum distortions and nonlinear dispersion in the interferometer. In embodiments, these methods operate on an interference signal to produce a corresponding repaired signal in which the effects of system errors are reduced (e.g., eliminated). For example, in a first step, a system characterization procedure determines the system errors by direct measurement of these errors in the frequency domain in terms of the amplitudes and phases of the transform coefficients. In a second step, the interference signal from the measurement surface is corrected, where the known phase and amplitude system errors are removed by subtraction, division or other data manipulation. The corrected data is then transformed back to provide a repaired interference signal from which spatial information about the measurement surface can be determined. Examples of such error corrections techniques are disclosed in commonly-owned Provisional Patent Application No. 60/832,452, entitled "COMPENSATION OF SYSTEMATIC EFFECTS IN SCANNING WHITE LIGHT INTERFEROMETRY," filed on Jul. 21, 2006, the entire contents of which are incorporated herein by reference.

In certain embodiments, the methods described above include a calibration that provides information about the spectroscopic detection system. In particular, the correspondence between a particular vertical location on the detector and the corresponding wavelength or wavenumber is established in the form of a wavelength mapping function. A baseline calibration of the optical system can be performed using, for example, one or more narrowband filters which allow one to establish the location on the detector that the corresponding calibration wavelengths are directed to. The mapping of the spectral range of interest can thus be calibrated in as much details as required for the target measurement accuracy. Such a mapping function can be used, for example, wherein imaging aberrations of the optical system may introduce relative displacements of the location of a given spectral component as a function of the location on the object.

Figure 5:
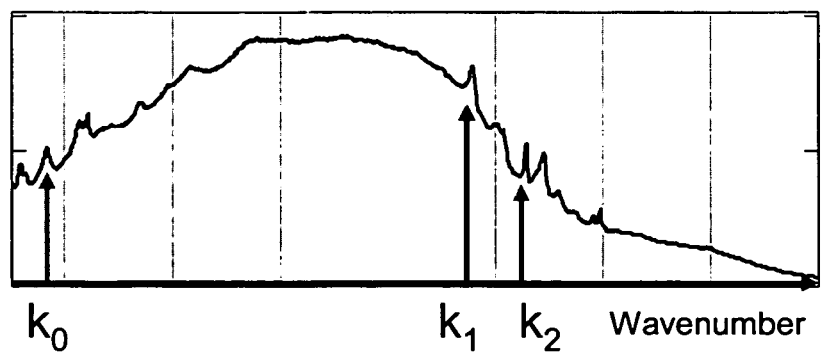
FIG. 5 is a plot of a broadband emission spectrum.

In some embodiments, variations of the wavelength mapping function can be monitored in situ. For example, the light source can be selected or constructed by combination of multiple light source outputs such that multiple sharp emission lines are present within the spectral domain covered by the detector. An exemplary spectrum is shown in FIG. 5, where the emission spectrum includes peaks at $k_0$, $k_1$, and $k_2$, for example, that can be used to map variations of the wavelength mapping function. These lines are identified and their position monitored at every exposure of the detector, providing real time correction of the mapping function if required. For the purpose of creating an interference signal in the time domain, the processing can be configured to ignore the locations where the lines are present, for example, by interpolating between nearby spectral components.

Tracking the location of known spectral lines is also a means of estimating the overall height offset of a measurement surface. A large height offset of the measurement surface can introduce a shift of the image of the projected line once imaged onto the camera. A beam block interrupting alternatively the measurement and reference beams provides two spectral images. The relative location of the known spectral lines in these two images can provide information about the height offset.

Typically, the spatial information is a profile of a section of the measurement surface corresponding to the line of points imaged to the detector. However, in general, the spatial information can include other parameters characterizing the measurement object. For example, the spatial information can include location and orientation (e.g., piston, tip and/or tilt with respect to the interferometer) of a measurement surface. In some embodiments, the spatial information can be used to identify a specific material or structure in the measurement object.

Moreover, while the measurement surface for object 101 is the top surface of the object, the techniques disclosed herein can be used to determine spatial information about other surfaces of the object. For example, in some embodiments, object 101 may include a substrate that is covered by a thin film structure (e.g., a photoresist on substrate, which may itself include one or more layers) and the techniques can be used to determine information about a surface at the interface between the thin film structure and the underlying substrate.

As an example, in some embodiments, input beam 161 can be polarized so that measurement beam 160 is substantially p-polarized at the measurement surface and is incident on the measurement object at Brewster's angle. Thus, a minimal amount of measurement beam radiation reflects from the top surface of measurement object 101, and most is transmitted through the top layer of the object. The transmitted radiation can be reflected by an interface between layers of object 101. Subsequent analysis of the combined beam provides spatial information about this interface, rather than the top surface of measurement object 101.

In some embodiments, system 100 can be used to determine spatial information about a two-dimensional area for the measurement surface. For example, the position of the measurement object can be scanned (e.g., by moving stage 170) with respect to the measurement light while detector 150 acquires a series of frames of the spatially-varying intensity pattern. For each frame, spatial information about a corresponding line of points on the measurement surface can be determined. The spatial information for the different lines of points can be combined to provide spatial information about an area of the surface.

In general, the spatial information can be output in a variety of ways. In some embodiments, the spatial information can be output graphically or numerically to an electronic display or a printer. In certain embodiments, the spatial information can be output to memory (e.g., to random access memory or written to non-volatile magnetic, optical, or other memory). In some embodiments, the spatial information can be output to a control system, such a wafer handling control system, which can adjust its operation based on the spatial information. For example, the system can adjust the position or orientation of the measurement object based on the spatial information.

The techniques described herein can include a number of advantages. For example, one benefit of this type of approach is readily apparent when measuring over a transparent film that is thicker than half the coherence length of the light source. In this case the top and bottom interfaces of the film generate light reflections that are combined in the spectral domain. However, in the OPD domain one observes two separated finite-width signals. It is then straightforward to determine the position of the top interface by processing the corresponding signal while ignoring the signal due to the bottom interface.

In addition, spatial information can be acquired rapidly and without mechanical adjustment of the system. Specifically, spatial information is acquired from a single frame of the detector, and without mechanical phase shifting.

Another benefit of the type of approach is the fact that one can rectify the shape of the emission spectrum before Fourier transformation, which allows shaping optimally the modulation envelope of the signal of interest in the spatial domain. For example, additional information for this step of the processing can be gathered by having a beam block close the measurement leg so that only the reference spectral distribution is recorded at the detector.

A further possible benefit of the configuration shown in FIG. 1A is the fact that the light bounces at a high angle of incidence from the measurement surface, which minimizes the influence of transparent layers present on the surface of object 101 when establishing the topography of the top surface.

Another possible benefit of the configuration is that direct observation of the object surface near normal incidence is un-obstructed, allowing other sensors to look at the object surface where it is being profiled (for example, an alignment microscope).

While a particular configuration for interferometry system 100 is shown in FIG. 1A, in general, other configurations can also be used to implement the methods described herein. For example, while interferometry system 100 utilizes a reflective diffraction grating, in general, a variety of optical elements can be used to spectrally-disperse the output beam onto the detector. For example, in some embodiments, a transmission grating can be used. More generally, a non-diffractive dispersive element, such as a prism, can also be used.

In some embodiments, system 100 can utilize a monochromatic source rather than a broadband source. In such cases, a low coherence length system can be produced by utilizing spatial coherence phenomena related to, e.g., the range of angles of incidence of light illuminating the measurement surface. For example, high NA imaging can be used to image a pupil plane of the system to the detector. In this way, different locations on the detector correspond to different angles of incidence of the measurement light on the measurement surface. No dispersive element is necessary as dispersal of the combined beam into different wavevectors is performed by the imaging optics. In some embodiments, the NA of the imaging systems can be about 0.15 or more (e.g., about 0.2 or more, about 0.3 or more, about 0.4 or more).

In certain embodiments, system 100 can include both a broadband source and high NA imaging.

Interferometry system 100 utilizes free space optics to direct light from source 110 to detector 150. However, configurations that utilize one or more waveguides can also be used.

Figure 6:
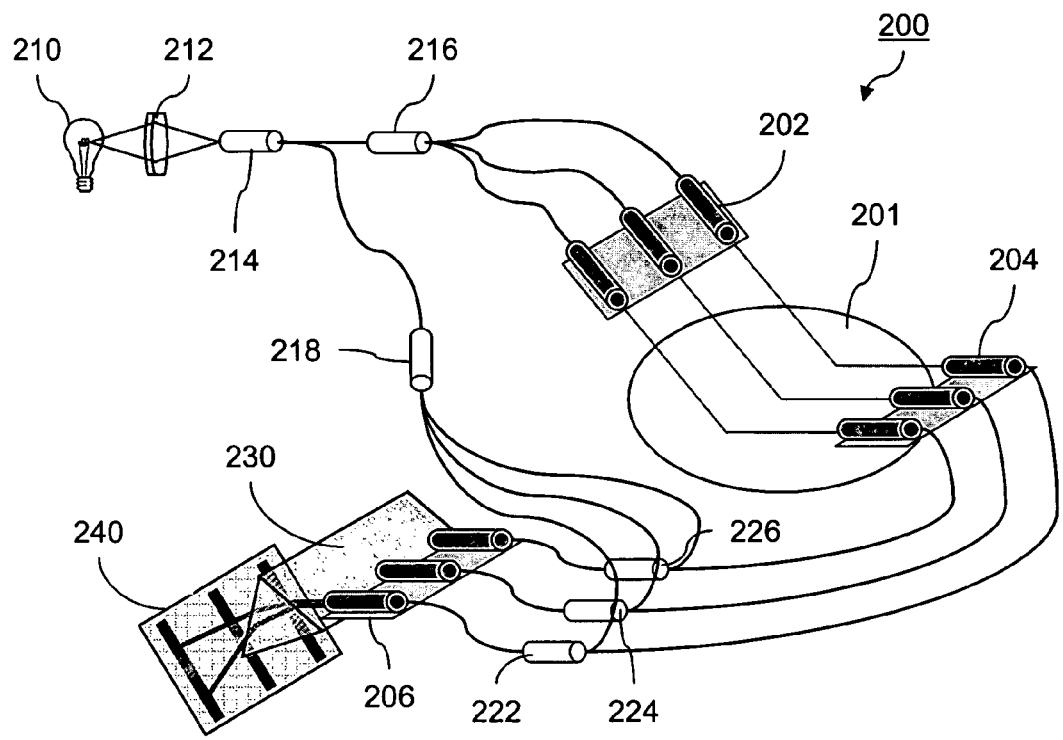
FIG. 6 is a perspective view of an embodiment of an grazing-incidence interferometry system.

For example, FIG. 6 shows interferometry system 200 which includes single mode fiber arrays to create and collect measurement beams. Specifically, interferometry system 200 includes a broadband light source 210, and a lens 212, which is configured to couple light from source 210 into a fiber beamsplitter 214. Fiber beamsplitter 214 splits the light into measurement light and reference light. The measurement light is directed through a fiber to another fiber beamsplitter 216, which directs the measurement light along multiple fibers that form a collimated fiber array 202. Fiber array 202 is position to illuminate a measurement object 201 with measurement light at a grazing angle of incidence. Light reflected from measurement object 201 is coupled into another collimated fiber array 204, which guides the light along fibers to beam combiners 222, 224, and 226. These beam combiners combine the measurement light with corresponding reference light that is directed via beamsplitter 214 and another beamsplitter 218 along a series of fibers. A further collimated fiber array 206 illuminates a prism 230 with the combined light.

Prism 230 spectrally disperses the combined light onto a multi-element detector 240. Analysis of the detected intensity pattern proceeds as described previously in connection with system 100.

Among other benefits, interferometry system 200 can allow for greater flexibility in the location of the various components of the instrument relative to configurations that utilize exclusively free space optics.

Systems 100 and 200 are examples of grazing-incidence interferometry systems.

Figure 7:
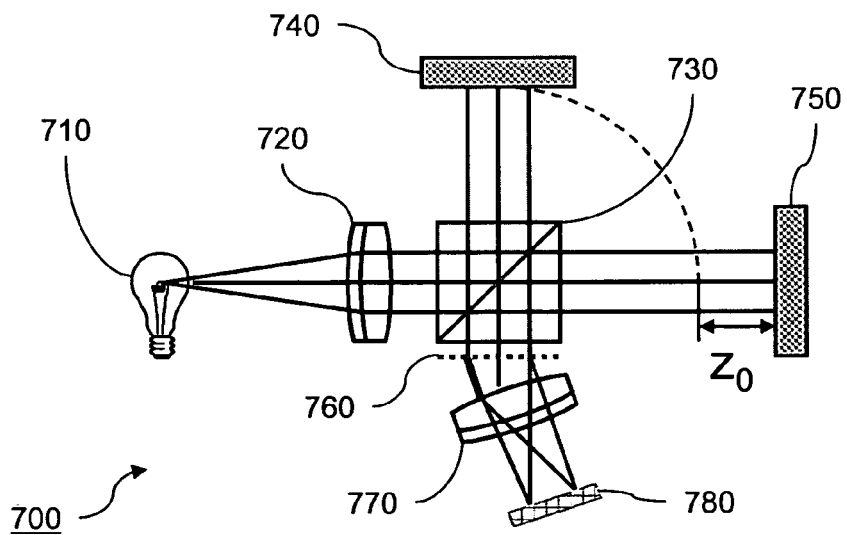
FIG. 7 is a schematic view of an embodiment of an interferometry system.

More generally, embodiments can include interferometry systems that are not grazing-incidence interferometry systems. For example, referring to FIG. 7, a interferometry system 700 is configured as a Michelson interferometer which directs measurement light to a measurement object 750 at a normal angle of incidence. Interferometry system 700 includes a broadband light source 710, a collimating lens 720, and a beamsplitter 730 that splits a collimated input beam into measurement beam and a reference beam. The measurement beam reflects from measurement object 750, while the reference beam reflects from a reference object. The reflected beams are recombined at beamsplitter 730 and directed through a transmission grating 760 and a focusing lens 770 onto a multi-element detector 780. The OPD between the reference and measurement beams is $2z_0$. The spectrally decomposed light detected at detector 780 can be analyzed as discussed previously.

Any of the analysis methods described above can be implemented in computer hardware or software, or a combination of both. The methods can be implemented in computer programs using standard programming techniques following the method and figures described herein. Program code is applied to input data to perform the functions described herein and generate output information. The output information is applied to one or more output devices such as a display monitor. Each program may be implemented in a high level procedural or object oriented programming language to communicate with a computer system. However, the programs can be implemented in assembly or machine language, if desired. In any case, the language can be a compiled or interpreted language. Moreover, the program can run on dedicated integrated circuits preprogrammed for that purpose.

Each such computer program is preferably stored on a storage medium or device (e.g., ROM or magnetic diskette) readable by a general or special purpose programmable computer, for configuring and operating the computer when the storage media or device is read by the computer to perform the procedures described herein. The computer program can also reside in cache or main memory during program execution. The analysis method can also be implemented as a computer-readable storage medium, configured with a computer program, where the storage medium so configured causes a computer to operate in a specific and predefined manner to perform the functions described herein.

The interferometry techniques described above may used for a variety of surface analysis problems, such as analyzing simple thin films; multilayer thin films; sharp edges and surface features that diffract or otherwise generate complex interference effects; unresolved surface roughness; unresolved surface features, for example, a sub-wavelength width groove on an otherwise smooth surface; dissimilar materials; polarization-dependent properties of the surface; and deflections, vibrations or motions of the surface or deformable surface features that result in incident-angle dependent perturbations of the interference phenomenon. For the case of thin films, the variable parameter of interest may be the film thickness, the refractive index of the film, the refractive index of the substrate, or some combination thereof. Exemplary applications including objects and devices exhibit such features are discussed next.

Figure 8A:
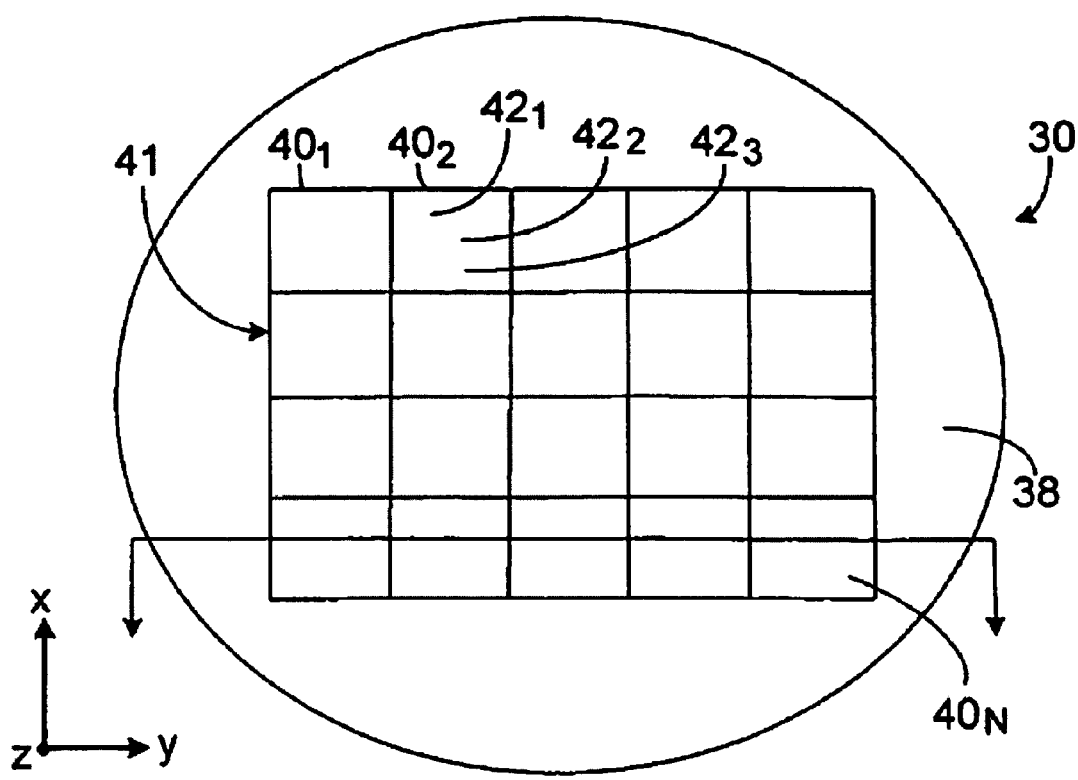
FIG. 8A is a cross-section of a measurement object including a substrate and an overlaying layer, e.g., a thin film.
Figure 8B:
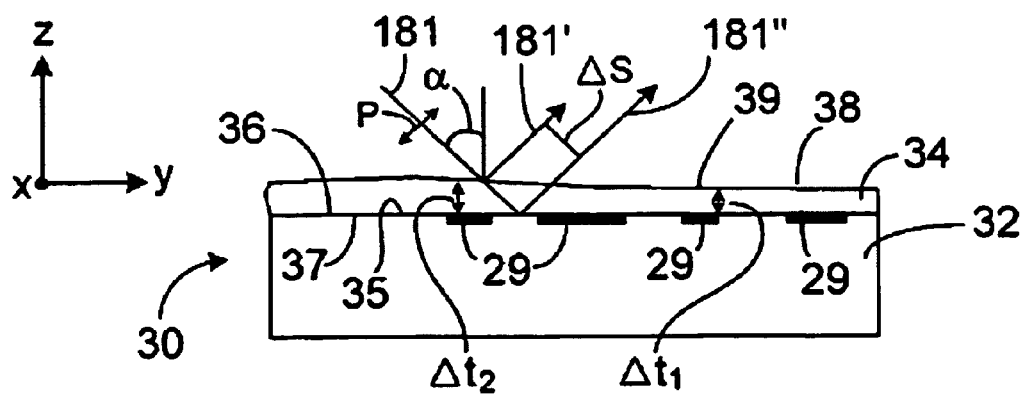
FIG. 8B is a top view of the object shown in FIG. 8A.

In many microelectronics applications, photolithography is used to pattern a layer of photoresist overlying a substrate, e.g., a silicon wafer. Referring to FIGS. 8A and 8B, an object 30 includes a substrate, e.g., a wafer, 32 and an overlying layer, e.g., photoresist layer 34. Object 30 includes a plurality of interfaces as occur between materials of different refractive index. For example, an object-surroundings interface 38 is defined where an outer surface 39 of photoresist layer 34 contacts the environment surrounding object 30, e.g., liquid, air, other gas, or vacuum. A substrate-layer interface 36 is defined between a surface 35 of wafer 32 and a bottom surface 37 of photoresist layer 34. Surface 35 of the wafer may include a plurality of patterned features 29. Some of these features have the same height as adjacent portions of the substrate but a different refractive index. Other features may extend upward or downward relative to adjacent portions of the substrate. Accordingly, interface 36 may exhibit a complex, varying topography underlying the outer surface of the photoresist.

A photolithography apparatus images a pattern onto the object. For example, the pattern may correspond with elements of an electronic circuit (or the negative of the circuit). After imaging, portions of the photoresist are removed revealing the substrate underlying the removed photoresist. The revealed substrate can be etched, covered with deposited material, or otherwise modified. Remaining photoresist protects other portions of the substrate from such modification.

To increase manufacturing efficiencies, more than one device is sometimes prepared from a single wafer. The devices may be the same or different. Each device requires that a subset of the wafer be imaged with a pattern. In some cases, the pattern is sequentially imaged onto different subsets. Sequential imaging can be performed for several reasons. Optical aberrations can prevent achieving adequate pattern focus quality over larger areas of the wafer. Even in the absence of optical aberrations, the spatial properties of the wafer and photoresist may also prevent achieving adequate pattern focus over large areas of the wafer. Aspects of the relationship between the spatial properties of the wafer/resist and focus quality are discussed next.

Referring to back to FIG. 8B, object 30 is shown with a number N subsets $40_i$, each smaller than a total area 41 the object to be imaged. Within each subset $40_i$, spatial property variations, e.g., height and slope variations of the wafer or photoresist, are typically smaller than when taken over the total area 41. Nonetheless, the wafer or photoresist of different subsets $40_i$ typically have different heights and slopes. For example, layer 34 exhibits thicknesses $\Delta t_1$, and $\Delta t_2$, which vary the height and slope of surface 39 (FIG. 8A). Thus, each subset of the object may have a different spatial relationship with the photolithography imager. The quality of focus is related to the spatial relationship, e.g., the distance between the object and the photolithography imager. Bringing different subsets of the object into proper focus may require relative repositioning of the object and imager. Because of the object height and slope variations, proper subset focus cannot be achieved solely by determining the position and orientation of the object with respect to a portion of the object that is remote to the imaged subset, e.g., a side 43 of the object.

Proper focus can be achieved by determining a spatial property of an object within a subset of the object to be imaged (or otherwise processed). Once the position of the subset has been determined, the object (and/or a portion of the photolithography imager) can be moved, e.g., translated, rotated, and/or tilted, to modify the position of the subset with respect to a reference, e.g., a portion of the photolithography imager. The determination and movement (if necessary) can be repeated for each subset to be imaged.

The determination of the spatial property of the subset can include determining a position and/or height of one or more points of an outer surface of a thin layer of the object, the one or more points lying within the subset of the object to be imaged. For example, the position and orientation of the outer surface 39 of subset 402 can be determined based upon the positions of points $42_1$-$42_3$ within the subset. The determination of the spatial property of the subset to be imaged can include using an interferometer to illuminate the subset with light and detecting an interference signal including light reflected from the illuminated subset. In some embodiments, a plurality of subsets are simultaneously imaged with light to obtain a plurality of interference signals. Each interference signal is indicative of one or more spatial properties of a subset. Thus, the interference signals can be used to prepare an image indicative of the topography of the object over a plurality of the subsets. During photolithography of the subsets, the wafer is positioned based upon the topography of the individual subsets as determined from the plurality of interference signals. Hence, each subset can be positioned for optimum focus with respect to the photolithography apparatus.

Detecting an interference signal from each subset of an object to be imaged can include detecting light reflected from the subset and reference light over an OPD range that is at least as large as a coherence length of the detected light. For example, the light may be detected at least over its coherence length. In some embodiments, the interferometer is configured so that the light reflected from the illuminated subset is dominated by light reflected from either an outer interface (such as outer surface 39) or an inner interface (such as interface 36). In some embodiments, a spatial property of an object is determined based on only a portion of the interference signal. For example, if the interference signal includes two or more overlapping interference patterns, a spatial property of the object can be determined based upon a portion of one of the interference patterns that is dominated by contributions from a single interface of the object.

In some embodiments, the techniques disclosed herein can be used to characterize copper interconnect structures, e.g., in conjunction with chemical mechanical polishing of the structures. It is becoming common among chip makers to use the so-called 'dual damascene copper' process to fabricate electrical interconnects between different parts of a chip. This is an example of a process which may be effectively characterized using a suitable surface topography system. The dual damascene process may be considered to have six parts: (1) an interlayer dielectric (ILD) deposition, in which a layer of dielectric material (such as a polymer, or glass) is deposited onto the surface of a wafer (containing a plurality of individual chips); (2) chemical mechanical polishing (CMP), in which the dielectric layer is polished so as to create a smooth surface, suitable for precision optical lithography, (3) a combination of lithographic patterning and reactive ion etching steps, in which a complex network is created comprising narrow trenches running parallel to the wafer surface and small vias running from the bottom of the trenches to a lower (previously defined) electrically conducting layer, (4) a combination of metal deposition steps which result in the deposition of copper trenches and vias, (5) a dielectric deposition step in which a dielectric is applied over the copper trenches and vias, and (6) a final CMP step in which the excess copper is removed, leaving a network of copper filled trenches (and possibly vias) surrounded by dielectric material.

Figure 9A:
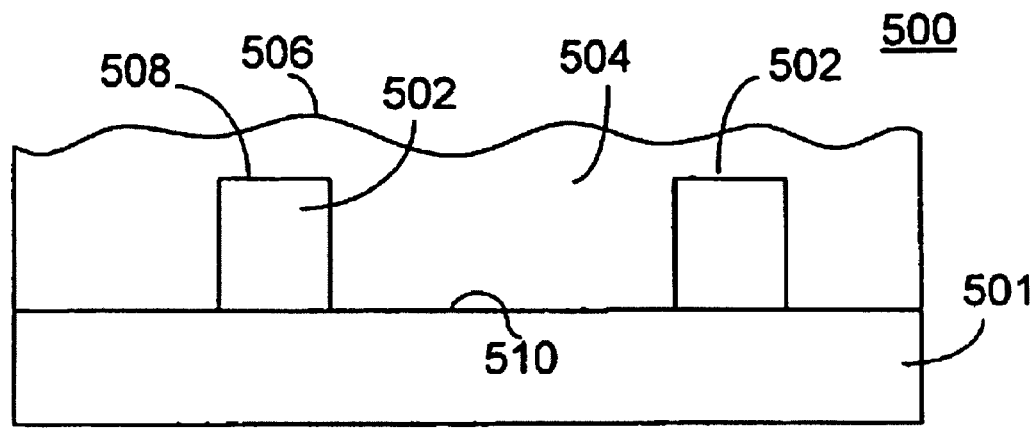
FIGS. 9A and 9B are examples of structures having copper interconnects.

Referring to FIG. 9A, a device 500 is exemplary of the a film structure resulting from the deposition of a dielectric 504 over copper features 502 deposited on a substrate 501. The dielectric 504 has a non-uniform outer surface 506 exhibiting height variations therealong. Interference signals obtained from device 500 can include interference patterns resulting from surface 506, an interface 508 between copper features 502 and dielectric 504, and an interface 510 between substrate 501 and dielectric 504. The device 500 may include a plurality of other features that also generate interference patterns.

Figure 9B:
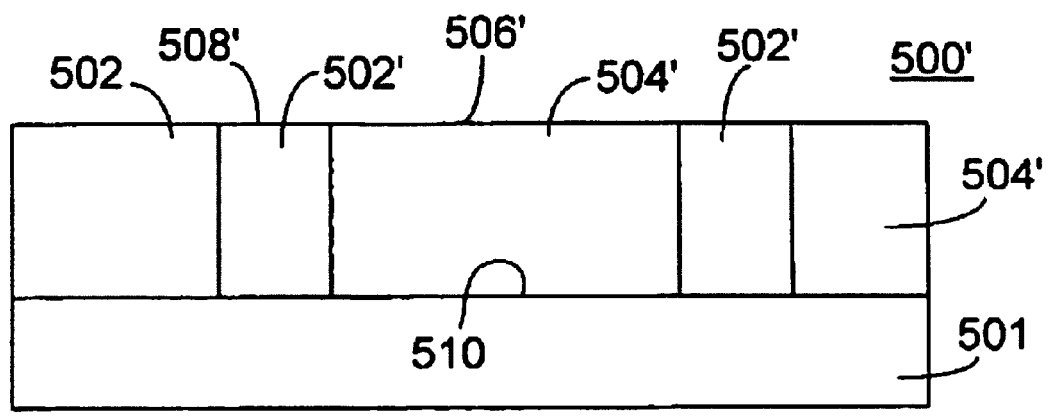

Referring to FIG. 9B, a device 500' illustrates the state of device 500 after the final CMP step. The upper surface 506 has been planarized to a surface 506', and interface 508 may now be exposed to the surroundings. Interface 510 at the substrate surface remains intact. Device performance and uniformity depends critically on monitoring the planarization of surface 504. It is important to appreciate that the polishing rate, and therefore the remaining copper (and dielectric) thickness after polishing, depends strongly and in a complex manner on the polishing conditions (such as the pad pressure and polishing slurry composition), as well as on the local detailed arrangement (i.e., orientation, proximity and shape) of copper and surrounding dielectric regions. Hence, portions of surface 506 over copper elements 502 may etch at different rates than other portions of surface 506. Additionally, once interface 508 of copper elements 502 is exposed, the dielectric and copper elements may exhibit different etch rates.

This 'position dependent polishing rate' is known to give rise to variable surface topography on many lateral length scales. For example, it may mean that chips located closer to the edge of a wafer on aggregate are polished more rapidly than those located close to the center, creating copper regions which are thinner than desired near the edges, and thicker than desired at the center. This is an example of a 'wafer scale' process nonuniformity—i.e., one occurring on length scale comparable to the wafer diameter. It is also known that regions which have a high density of copper trenches polish at a higher rate than nearby regions with low copper line densities. This leads to a phenomenon known as 'CMP induced erosion' in the high copper density regions. This is an example of a 'chip scale' process non-uniformity—i.e., one occurring on a length scale comparable to (and sometimes much less than) the linear dimensions of a single chip. Another type of chip scale nonuniformity, known as 'dishing', occurs within single copper filled trench regions (which tend to polish at a higher rate than the surrounding dielectric material). For trenches greater than a few microns in width dishing may become severe with the result that affected lines later exhibit excessive electrical resistance, leading to a chip failure.

CMP induced wafer and chip scale process nonuniformities are inherently difficult to predict, and they are subject to change over time as conditions within the CMP processing system evolve. To effectively monitor, and suitably adjust the process conditions for the purpose of ensuring that any non-uniformities remain within acceptable limits, it is important for process engineers to make frequent non-contact surface topography measurements on chips at a large number and wide variety of locations. This is possible using embodiments of the interferometry methods and systems described above.

In some embodiments one or more spatial properties, e.g., the topography of surface 506 and/or the thickness of dielectric 504, are monitored by obtaining low coherence interference signals from the structure before and/or during CMP. Based on the spatial properties, the polishing conditions can be changed to achieve the desired planar surface 506'. For example, the pad pressure, pad pressure distribution, polishing agent characteristics, solvent composition and flow, and other conditions can be determined based on the spatial properties. After some period of polishing, the spatial property can again be determined and the polishing conditions changed as needed. The topography and/or thickness is also indicative of the end-point at which, e.g., surface 504' is achieved. Thus, the low coherence interference signals can be used to avoid depressions caused by over polishing different regions of the object. The low coherence interference methods and systems are advantageous in this respect because spatial properties of the device, e.g., the relative heights of the surface of the dielectric (a) over copper elements 502 and (b) over substrate surface 510 but adjacent copper elements 502 can be determined even in the presence of the multiple interfaces.

Figure 10A:
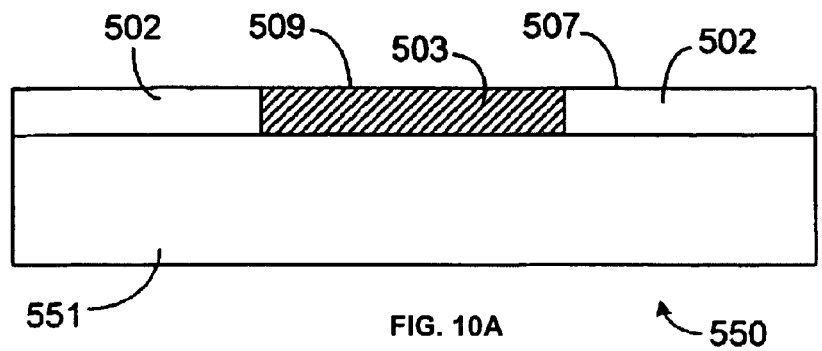
FIGS. 10A and 10B are examples of structures before and after solder bump processing.
Figure 10B:
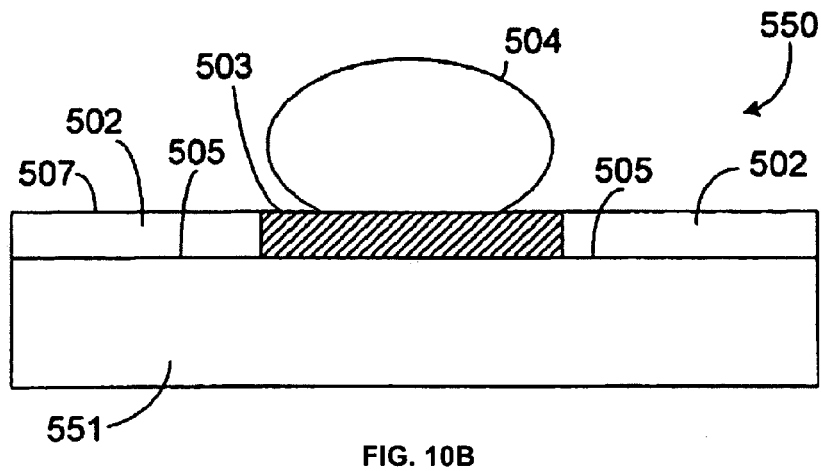

In certain embodiments, the techniques disclosed herein can be used to monitor surfaces during solder bump processing. Referring to FIGS. 10A and 10B, a structure 550 is exemplary of a structure produced during solder bump processing. Structure 550 includes a substrate 551, regions 502 non-wettable by solder, and a region 503 wettable by solder. Regions 502 have an outer surface 507. Region 503 has an outer surface 509. Accordingly, an interface 505 is formed between regions 502 and substrate 501.

During processing a mass of solder 504 is positioned in contact with wettable region 503. Upon flowing the solder, the solder forms a secure contact with the wettable region 503. Adjacent non-wettable regions 502 act like a dam preventing the flowed solder from undesirable migration about the structure. It is desirable to know spatial properties of the structure including the relative heights of surfaces 507, 509 and the dimensions of solder 504 relative to surface 502. As can be determined from other discussions herein, structure 550 includes a plurality of interfaces that may each result in an interference pattern. Overlap between the interference patterns prevents accurate determinate of the spatial properties using known interference techniques. Application of the systems and methods discussed herein allow the spatial properties to be determined.

Spatial information determined from structure 550 can be used to change manufacturing conditions, such as deposition times for layers 502,503 and the amount of solder 504 used per area of region 503. Additionally, heating conditions used to flow the solder can also be changed based on the spatial properties to achieve adequate flow and or prevent migration of the solder.

Figure 11:
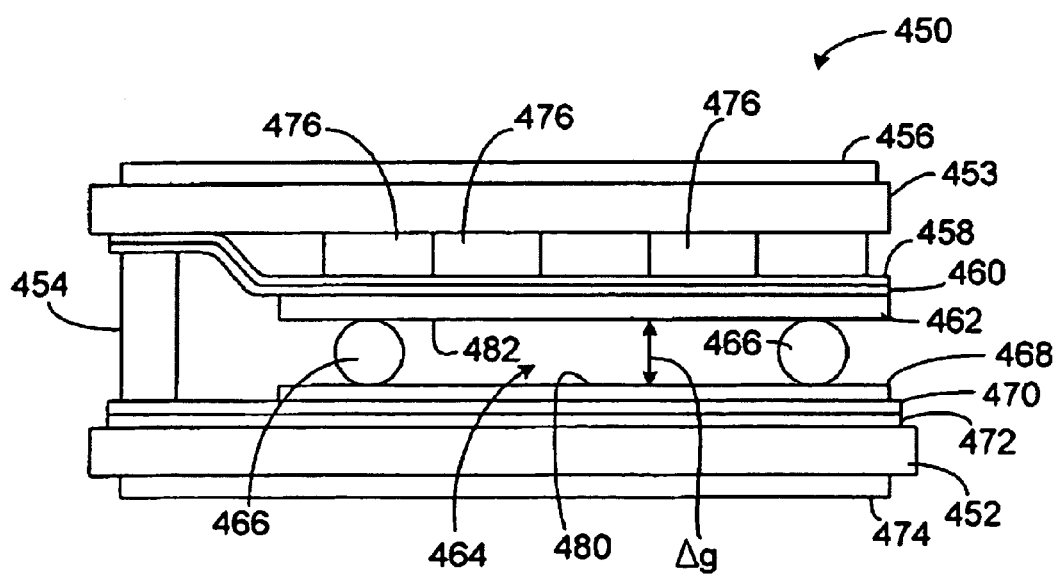
FIG. 11 is a cross-section of a portion of a liquid crystal display.

The techniques disclosed herein can also be used to determine spatial information of one or more surfaces of a Liquid Crystal Display (LCD) panel during its fabrication. Referring to FIG. 11, a passive matrix LCD 450, for example, is composed of several layers. The main parts are two glass plates 452,453 connected by seals 454. A polarizer 456 is applied to the front glass plate 453 in order to polarize incoming light in a single direction. The polarized light passes through the front glass plate 453. An Indium Tin Oxide (ITO) layer 458 is used as an electrode. A passivation layer 460, sometimes called hard coat layer, based on $SiO_x$ is coated over the ITO 458 to electrically insulate the surface. Polyimide 462 is printed over the passivation layer 460 to align the liquid crystal fluid 464. The liquid crystal fluid is sensitive to electric fields and changes orientation when an electric field is applied. The liquid crystal is also optically active and rotates the polarization direction of the incoming light. The cell gap $\Delta g$, i.e., thickness of the liquid crystal layer 464, is determined by spacers 466, which keep the two glass plates 452,453 at a fixed distance. When there is no electric potential from the front plate 453 to the rear plate 452, the polarized light is rotated 90 .degree. as it passes through the liquid crystal layer 464. When an electric potential is applied from one plate to the other plate the light is not rotated. After the light has passed through the liquid crystal layer 464, it passes through another polyimide layer 468, another hard coat layer 470, a rear ITO electrode 472, and the rear glass plate 452. Upon reaching a rear polarizer 474, the light either transmitted through or absorbed, depending on whether or not it has been rotated 90°. The cell 450 may include filters 476 or other colorizing elements to provide a color display.

The cell gap $\Delta g$ determines to a great extent the optoelectrical properties of the LCD, e.g., the contrast ratio and brightness. Cell gap control during manufacturing is critical to obtaining uniform, quality displays. The actual cell gap may differ from the dimensions of spacers 466 because, during assembly, pressure or vacuum is applied to introduce the liquid crystal medium, seals 454 cure and may change dimensions, and the added liquid crystal medium generates capillary forces between plates 452,453. Both before and after adding the liquid crystal medium 464, surfaces 480,482 of plates 452,453 reflect light that results in an interference pattern indicative of the cell gap $\Delta g$. The low coherence nature of the interference signal either itself or in combination with the described interference signal processing techniques can be used to monitor properties of the cell including the cell gap $\Delta g$ during manufacture even in the presence of interfaces formed by other layers of the cell.

An exemplary method can include obtaining a low coherence interference signal including interference patterns indicative of the cell gap $\Delta g$ prior to adding layer 464. The cell gap (or other spatial property of the cell) is determined from the interference patterns and can be compared to a specified value. Manufacturing conditions, e.g., a pressure or vacuum applied to plates 452,453 can be changed to modify the cell gap $\Delta g$ if a difference between the specified value and the determined cell gap exceeds tolerances. This process can be repeated until achieving the desired cell gap. Liquid crystal medium is then introduced into the cell. The amount of liquid crystal medium to be added can be determined from the measured spatial property of the cell. This can avoid over- or underfilling the cell. The filling process can also be monitored by observing interference signals from the surfaces 480,482. Once the cell has been filed, additional low coherence interference patterns are obtained to monitor the cell gap $\Delta g$ (or other spatial property). Again, the manufacturing conditions can be changed so that the cell gap is maintained or brought within tolerances.

In some embodiments, the techniques described herein can be implemented in manufacturing that involve laser scribing and cutting. For example, lasers can be used to scribe objects in preparation for separating different, concurrently manufactured structures, e.g., microelectronics structures. The quality of separation is related to the scribing conditions, e.g., laser focus size, laser power, translation rate of the object, and scribe depth. Because the density of features of the structure may be large, the scribe lines may be adjacent thin film or layers of the structures. Interfaces associated with the thin film or layers may create interference patterns that appear when interferometry is used to determine the scribe depth. The techniques described herein can be used to determine the scribe depth even in the presence of such adjacent films or layers.

An exemplary method can include scribing one or more electronic structures and separating the structures along the scribe lines. Before and/or after separation, low coherence interference signals can be used to determine the depth of scribe. Other scribing conditions are known, e.g., laser spot size, laser power, translation rate. The scribe depth can be determined from the interference signals. The quality of separation as a function of the scribing conditions, including the scribe depth, can be determined by evaluating the separated structures. Based on such determinations, the scribing conditions necessary to achieve a desired separation quality can be determined. During continued manufacturing, low coherence interference signals can be obtained from scribed regions to monitor the process. Scribing conditions can be changed to maintain or bring the scribe properties within tolerances.

Other embodiments are in the claims.

What is claimed is:

1. A method, comprising:
   directing measurement light to reflect from a measurement surface, where the measurement light simultaneously illuminates multiple locations of the measurement surface;
   combining the reflected measurement light with reference light, wherein the measurement light and reference light are derived from a common source, and there is a non-zero optical path length difference between the measurement light and reference light that is greater than a coherence length of the measurement light;
   spectrally dispersing the combined light onto a multi-element detector to detect a spatially-varying intensity pattern;
   determining spatial information about the multiple locations of the measurement surface based on the spatially-varying intensity pattern; and
   outputting the spatial information.

2. The method of claim 1, wherein determining the spatial information comprises performing a spatial-frequency transform of the spatially-varying intensity pattern and spatial information is determined based on the spatial-frequency transform.

3. The method of claim 2, wherein the spatial-frequency transform provides a corresponding interference signal for each of the locations of the measurement surface and determining the spatial information comprises analyzing a portion of each interference signal corresponding to a non-zero optical path length difference between the measurement light and reference light.

4. The method of claim 2, wherein the spatial-frequency transform is performed for each of a plurality of one-dimensional sections of the spatially-varying intensity pattern to provide a corresponding interference signal for each section.

5. The method of claim 4, wherein each interference signal is related to an optical path length difference between the reference light and measurement light reflected from a point on a line on the measurement surface corresponding to the section of the spatially-varying intensity pattern from which the interference signal is derived.

6. The method of claim 2, wherein the spatial frequency transform is a Fourier transform.

7. The method of claim 1, wherein the multiple locations are a line of points on the measurement surface where measurement light reflected from the line of points is directed to a corresponding line of elements of the multi-element detector extending along a first dimension of the detector.

8. The method of claim 7, wherein the measurement light reflected from each point on the line of points is spectrally dispersed across a corresponding line of elements of the multi-element detector extending along a second dimension of the detector.

9. The method of claim 8, wherein the position of each detector element along the second dimension of the detector corresponds to a wavenumber of the measurement light.

10. The method of claim 8, wherein determining the spatial information comprises performing a spatial-frequency transform for each point by transforming an intensity profile from the corresponding line of elements of the multi-element detector to produce an interference signal.

11. The method of claim 10, wherein the interference signal for each point includes information about the optical path length difference between measurement light reflected from the point and the reference light combined with the measurement light reflected from the point.

12. The method of claim 11, wherein the spatial information is determined by analyzing the interference signal for each point to determine surface height variations along the line of points on the measurement surface.

13. The method of claim 12, wherein the measurement surface is on a measurement object comprising a thin film on a substrate, and wherein analyzing the interference signal for each point on the line comprises selecting a subset of the interference signal corresponding to the top surface of the thin film and analyzing the subset to determine a relative surface height for each point of the top surface of the thin film along the line.

14. The method of claim 1, wherein the measurement light is broadband measurement light.

15. The method of claim 1, wherein the measurement light is directed to reflect from the measurement surface at a grazing angle of incidence.

16. The method of claim 1, wherein the measurement light is directed to reflect from the measurement surface at an angle of incidence of about 60° or more.

17. The method of claim 1, wherein the measurement surface is on a measurement object comprising a thin film on a substrate.

18. The method of claim 17, wherein the spatial information corresponds to a relative height profile for a surface of the thin film opposite the substrate.

19. The method of claim 17, wherein the spatial information corresponds to a relative height profile of a surface of the thin film adjacent the substrate.

20. The method of claim 1, wherein the measurement light is in the visible region of the electromagnetic spectrum.

21. The method of claim 1, wherein the measurement light is outside the visible region of the electromagnetic spectrum.

22. The method of claim 1, wherein the measurement light has a spectral bandwidth of about 50 nm or more.

23. A process for manufacturing an integrated circuit, the process comprising:
providing a wafer supporting a layer of a photoresist;
positioning the wafer relative to a photolithography apparatus, wherein a surface of the layer of photoresist corresponds to the measurement surface of claim 1 and the wafer is positioned based on spatial information provided using the system of claim 1;
exposing the layer of photoresist to radiation using the photolithography apparatus; and
making an integrated circuit using the wafer.

24. A process for making a liquid crystal display, the process comprising:
providing a components of a liquid crystal display, the component comprising a glass plate;
determining spatial information about the component using the method of claim 1, wherein a surface of the component corresponds to the measurement surface;
modifying the component based on the determined spatial information; and
making a liquid crystal display using the modified component.

25. The process of claim 24, wherein the component comprises a pair of glass plates that define a cell gap, and the spatial information is information about the cell gap.

26. The process of claim 25, wherein modifying the component comprises adjusting the cell gap.

27. The process of claim 26, wherein making the liquid crystal display comprises filling the adjusted cell gap with a liquid crystal material.

28. A method, comprising:
directing measurement light to reflect from a measurement surface, where the measurement light simultaneously illuminates multiple locations of the measurement surface;
combining the reflected measurement light with reference light, wherein the measurement light and reference light are derived from a common source;
spectrally dispersing the combined light onto a multi-element detector to detect a spatially-varying intensity pattern;
performing a spatial-frequency transform of the spatially-varying intensity pattern;
determining spatial information about the multiple locations of the measurement surface based on the spatial-frequency transform; and
outputting the spatial information.

29. A system, comprising:
a light source being configured to produce input light during operation of the system;
a multi-element detector;
a dispersive optical element;
an interferometer configured to derive measurement light and reference light from the input light, simultaneously illuminate multiple locations of a measurement surface with the measurement light, combine the reference light with the measurement light reflected the measurement surface, and direct the combined light to the dispersive optical element which spectrally disperses the combined light onto the multi-element detector to provide a spatially-varying intensity pattern on the detector elements, wherein the input light has a finite coherence length and the interferometer introduces an optical path length difference between the measurement light and the reference light that is greater than the coherence length of the input light; and
a computer in communication with the detector, the computer being programmed to determine spatial information about the multiple locations of the measurement surface based on the spatially-varying intensity pattern.

30. The system of claim 29, wherein the computer is programmed to perform a spatial-frequency transform of the spatially-varying intensity pattern and to determine the spatial information about the multiple locations of the measurement surface based on the spatial-frequency transform.

31. The system of claim 29, wherein the light source is a broadband light source.

32. The system of claim 29, wherein the light source is a spatially-extended light source.

33. The system of claim 29, wherein the interferometer comprises optical elements configured to image the light source to the detector.

34. The system of claim 33, wherein the optical elements image the light source to the measurement surface and reimage the light source from the measurement surface to the detector.

35. The system of claim 33, wherein the optical elements are arranged to preserve a relative orientation of the images of the light source at the detector formed by the measurement light and reference light, respectively.

36. The system of claim 29, wherein the multi-element detector comprises a two-dimensional array of detector elements and the dispersive optical element is configured to spectrally disperse the combined light along one of the array dimensions.

37. The system of claim 29, wherein the dispersive optical element comprises agrating.

38. The system of claim 29, wherein the dispersive optical element comprises a prism.

39. The system of claim 29, wherein the interferometer directs the measurement light to the measurement surface at a grazing angle of incidence.

40. The system of claim 29, wherein the interferometer comprises a beam splitter positioned to separate the input light into the test and reference light.

41. The system of claim 40, wherein the interferometer comprises multiple mirrors positioned to reflect the reference light after separating it from the input light and before combining it with the measurement light.

42. The system of claim 29, wherein the interferometer is configured to direct the measurement light to the measurement surface at a non-normal angle of incidence, and wherein the system further comprises a photolithography apparatus arranged to image a pattern onto the measurement surface.

43. The system of claim 42, further comprising an alignment microscope for positioning the measurement surface relative to the photolithography apparatus.

44. The system of claim 42, wherein the computer is programmed to cause an adjustment of the angular orientation of the measurement surface relative to the photolithography apparatus based on the spatial information.

45. The system of claim 29, wherein the interferometer comprises a fiber array positioned to direct the measurement light to the measurement surface by a fiber array.

46. The system of claim 45, wherein the interferometer further comprises a second fiber array positioned to combine the measurement light and reference light.

47. The system of claim 29, wherein the interferometer is configured and the computer is programmed to repeat the analysis for additional locations of the measurement surface to determine spatial information about different portions of the measurement surface.

48. A process for manufacturing an integrated circuit, the process comprising:
providing a wafer supporting a layer of a photoresist;
positioning the wafer relative to a photolithography apparatus, wherein a surface of the layer of photoresist corresponds to the measurement surface of claim 29 and the wafer is positioned based on spatial information provided using the system of claim 29;
exposing the layer of photoresist to radiation using the photolithography apparatus; and
making an integrated circuit using the wafer.

49. A process for making a liquid crystal display, the process comprising:
providing a components of a liquid crystal display, the component comprising a glass plate;
determining spatial information about the component using the system of claim 29, wherein a surface of the component corresponds to the measurement surface;
modifying the component based on the determined spatial information; and
making a liquid crystal display using the modified component.

50. The process of claim 49, wherein the component comprises a pair of glass plates that define a cell gap, and the spatial information is information about the cell gap.

51. The process of claim 50, wherein modifying the component comprises adjusting the cell gap.

52. The process of claim 51, wherein making the liquid crystal display comprises filling the adjusted cell gap with a liquid crystal material.

53. A method, comprising:
directing measurement light to reflect from a measurement surface;
combining the reflected measurement light with reference light, wherein the measurement light and reference light are derived from a common source, and there is a non-zero optical path length difference between the measurement light and reference light that is greater than a coherence length of the measurement light;
spectrally dispersing the combined light onto a multi-element detector to detect a spatially-varying intensity pattern;
determining spatial information about the measurement surface based on the spatially-varying intensity pattern; and
outputting the spatial information,
wherein the spatial information is information about a line of points on the measurement surface where measurement light reflected from the line of points is directed to a corresponding line of elements of the multi-element detector extending along a first dimension of the detector, the measurement light reflected from each point on the line of points is spectrally dispersed across a corresponding line of elements of the multi-element detector extending along a second dimension of the detector, determining the spatial information comprises performing a spatial-frequency transform for each point by transforming an intensity profile from the corresponding line of elements of the multi-element detector to produce an interference signal, the interference signal for each point including information about the optical path length difference between measurement light reflected from the point and the reference light combined with the measurement light reflected from the point, the spatial information is determined by analyzing the interference signal for each point to determine surface height variations along the line of points on the measurement surface, the measurement surface is on a measurement object comprising a thin film on a substrate, and analyzing the interference signal for each point on the line comprises selecting a subset of the interference signal corresponding to the top surface of the thin film and analyzing the subset to determine a relative surface height for each point of the top surface of the thin film along the line.

54. A method, comprising:
directing measurement light to reflect from a measurement surface, wherein a path of the measurement light is characterized by chief rays which are incident on the measurement surface at a non-zero angle of incidence;
combining the reflected measurement light with reference light, wherein the measurement light and reference light are derived from a common source, and there is a non-zero optical path length difference between the measurement light and reference light that is greater than a coherence length of the measurement light;

spectrally dispersing the combined light onto a multi-element detector to detect a spatially-varying intensity pattern;

determining spatial information about the measurement surface based on the spatially-varying intensity pattern; and outputting the spatial information.

55. A method, comprising:

directing measurement light to reflect from a measurement surface;

combining the reflected measurement light with reference light, wherein the measurement light and reference light are derived from a common source, and there is a non-zero optical path length difference between the measurement light and reference light that is greater than a coherence length of the measurement light;

spectrally dispersing the combined light onto a multi-element detector to detect a spatially-varying intensity pattern;

determining spatial information about multiple locations of the measurement surface based on the spatially-varying intensity pattern; and outputting the spatial information, wherein the multiple locations are a line of points on the measurement surface where measurement light reflected from the line of points is directed to a corresponding line of elements of the multi-element detector extending along a first dimension of the detector, the measurement light reflected from each point on the line of points is spectrally dispersed across a corresponding line of elements of the multi-element detector extending along a second dimension of the detector, determining the spatial information comprises performing a spatial-frequency transform for each point by transforming an intensity profile from the corresponding line of elements of the multi-element detector to produce an interference signal, the interference signal for each point including information about the optical path length difference between measurement light reflected from the point and the reference light combined with the measurement light reflected from the point and the spatial information is determined by analyzing the interference signal for each point to determine surface height variations along the line of points on the measurement surface, and wherein the measurement surface is on a measurement object comprising a thin film on a substrate, and analyzing the interference signal for each point on the line comprises selecting a subset of the interference signal corresponding to the top surface of the thin film and analyzing the subset to determine a relative surface height for each point of the top surface of the thin film along the line.

56. A system, comprising:

a light source being configured to produce input light during operation of the system;

a multi-element detector;

a dispersive optical element;

an interferometer configured to derive measurement light and reference light from the input light, illuminate a section of a measurement surface with the measurement light, combine the reference light with the measurement light reflected the measurement surface, and direct the combined light to the dispersive optical element which spectrally disperses the combined light onto the multi-element detector to provide a spatially-varying intensity pattern on the detector elements, wherein the input light has a finite coherence length and the interferometer introduces an optical path length difference between the measurement light and the reference light that is greater than the coherence length of the input light;

a computer in communication with the detector, the computer being programmed to determine spatial information about multiple locations of the measurement surface based on the spatially-varying intensity pattern, wherein the interferometer is configured to direct the measurement light to the measurement surface at a non-normal angle of incidence, and wherein the system further comprises a photolithography apparatus arranged to image a pattern onto the measurement surface.

57. The system of claim 56, further comprising an alignment microscope for positioning the measurement surface relative to the photolithography apparatus.

58. The system of claim 56, wherein the computer is programmed to cause an adjustment of the angular orientation of the measurement surface relative to the photolithography apparatus based on the spatial information.

* * * * *

UNITED STATES PATENT AND TRADEMARK OFFICE
CERTIFICATE OF CORRECTION

| | | |
|---|---|---|
| PATENT NO. | : 7,636,168 B2 | Page 1 of 1 |
| APPLICATION NO. | : 11/546119 | |
| DATED | : December 22, 2009 | |
| INVENTOR(S) | : Colonna de Lega et al. | |

It is certified that error appears in the above-identified patent and that said Letters Patent is hereby corrected as shown below:

ON THE TITLE PAGE:
Item (12) delete inventor name "De Lega et al.", insert --Colonna de Lega et al.--.

ON THE TITLE PAGE: ITEM (56) REFERENCES CITED
In column 2 (Other Publications), line 1 delete "fo", insert --of--.

IN THE CLAIMS:
Column 25, claim 23, line 57, delete "system", insert --method--.

Column 27, claim 37, line 15, delete "agrating", insert --a grating--.

Signed and Sealed this
Twenty-first Day of June, 2011

David J. Kappos
*Director of the United States Patent and Trademark Office*